(12) United States Patent
Nishikido

(10) Patent No.: US 9,338,376 B2
(45) Date of Patent: May 10, 2016

(54) SOLID-STATE IMAGING DEVICE AND TECHNIQUE OF IMPROVING SIGNAL OUTPUT CHARACTERISTICS FROM A LIGHT RECEIVING ELEMENT

(71) Applicant: RENESAS ELECTRONICS CORPORATION, Kawasaki-shi, Kanagawa (JP)

(72) Inventor: Osamu Nishikido, Kawasaki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 260 days.

(21) Appl. No.: 14/067,929

(22) Filed: Oct. 30, 2013

(65) Prior Publication Data

US 2014/0124654 A1 May 8, 2014

(30) Foreign Application Priority Data

Oct. 31, 2012 (JP) ................................. 2012-240060
Aug. 30, 2013 (JP) ................................. 2013-179979

(51) Int. Cl.
*H04N 5/359* (2011.01)
*H04N 5/363* (2011.01)
*H04N 5/3745* (2011.01)

(52) U.S. Cl.
CPC ............. *H04N 5/3597* (2013.01); *H04N 5/363* (2013.01); *H04N 5/37457* (2013.01)

(58) Field of Classification Search
CPC .. H04N 5/3597; H04N 5/363; H04N 5/37457
See application file for complete search history.

(56) References Cited

U.S. PATENT DOCUMENTS

2003/0146992 A1* 8/2003 Koyama ............... H04N 5/3653
348/302
2012/0145883 A1* 6/2012 Liu .......................... H04N 5/33
250/208.1

FOREIGN PATENT DOCUMENTS

JP 2005311487 A 11/2005

\* cited by examiner

*Primary Examiner* — Francis M Legasse, Jr.
(74) *Attorney, Agent, or Firm* — McDermott Will & Emery LLP

(57) ABSTRACT

As a reset transistor is turned on, an FD (Floating Diffusion) is reset to VDD and then stores charges transferred from a light receiving element. By a source-follower circuit formed by an amplifying transistor, a selection transistor and a current source, a voltage in accordance with a potential of FD is output to a data line. A second output circuit generates an output voltage VOUT in accordance with the potential of FD at an output node. Output transistors in output circuit are configured to generate a potential difference equivalent to the potential difference between FD and data line caused by the amplifying transistor and selection transistor, between data line and output node.

15 Claims, 15 Drawing Sheets

SOLID-STATE IMAGING DEVICE AND TECHNIQUE OF IMPROVING SIGNAL OUTPUT CHARACTERISTICS FROM A LIGHT RECEIVING ELEMENT

BACKGROUND OF THE INVENTION

1. Field of the Invention

The present invention relates to a solid-state imaging device and, more specifically, to a technique of improving signal output characteristics from a light receiving element.

2. Description of the Background Art

A CMOS (Complementary Metal Oxide Semiconductor) image sensor as one type of solid-state imaging device utilizes a configuration in which charges from pixels including light receiving elements are transferred to a floating diffusion and a potential of the floating diffusion is read using a source-follower amplifier.

By way of example, Japanese Patent Laying-Open No. 2005-311487 (JP 2005-311487A) describes a configuration of a solid-state imaging device including: a light receiving element (photo-diode); an MOS transistor for transfer, receiving a row selection signal at its gate; an MOS transistor for resetting the potential of floating diffusion; and an amplifying transistor for forming the source-follower amplifier with a constant current source outside of the pixels. In the solid-state imaging device described in JP 2005-311487A, a differential transistor forming a differential pair with the amplifying transistor in the pixel is connected through a signal line to which a signal is output from a unit pixel, and an output signal from the pixel is derived from the differential transistor. This enables improved dynamic range and linearity.

SUMMARY OF THE INVENTION

The configuration of solid-state imaging device described in JP 2005-311487A, however, has a problem of increased size of the circuit that contains the differential transistor for improving output characteristics. Further, since the potential level at the time of resetting the floating diffusion (hereinafter also referred to as reset potential) varies, the output characteristics may possibly be degraded.

Therefore, it is desired to improve output characteristics when a signal in accordance with the amount of received light is output from the light receiving element, without enlarging the circuit scale.

A possible method of improving the output characteristics is to make the control voltage (gate voltage) of the transistor in the output signal deriving path including the resetting MOS transistor mentioned above sufficiently higher than the power supply voltage of the pixel. This method, however, requires a structure for increasing the power supply voltage, which leads to an increased circuit scale. Further, when applied to a surveillance camera, 24-hours operation is required and, therefore, application of a high voltage is undesirable also from the viewpoint of device life. Thus, it is desired to improve the output characteristics without using a high voltage that requires boosting of the power supply voltage.

According to an embodiment, the present invention provides a solid-state imaging device, including: a light receiving element generating and storing charges in accordance with an amount of received light; a floating diffusion configured to receive charges transferred from the light receiving element; a first output circuit; and a second output circuit. The first output circuit is driven by a power supply voltage and configured to output a voltage in accordance with a potential of the floating diffusion to a data line. The second output circuit is connected in parallel with the first output circuit to the data line. The first output circuit includes at least one first transistor electrically connected between the data line and a power supply line supplying the power supply voltage. The second output circuit includes an output node to which an output voltage in accordance with the potential of the floating diffusion is generated, and at least one second transistor connected between the output node and the data line. The second transistor is configured to generate a potential difference equivalent to a potential difference between the floating diffusion and the data line derived from the first transistor between the data line and the output node, when a current equivalent to a current flowing through the first transistor is caused to flow through the second transistor.

By the embodiment mentioned above, it becomes possible in a solid-state imaging device to improve the output characteristics when a signal in accordance with the amount of received light is output from the light receiving element.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, preferable embodiments of the present invention will be described in detail with reference to the figures.

Embodiment 1

Overall Configuration

Figure 1:
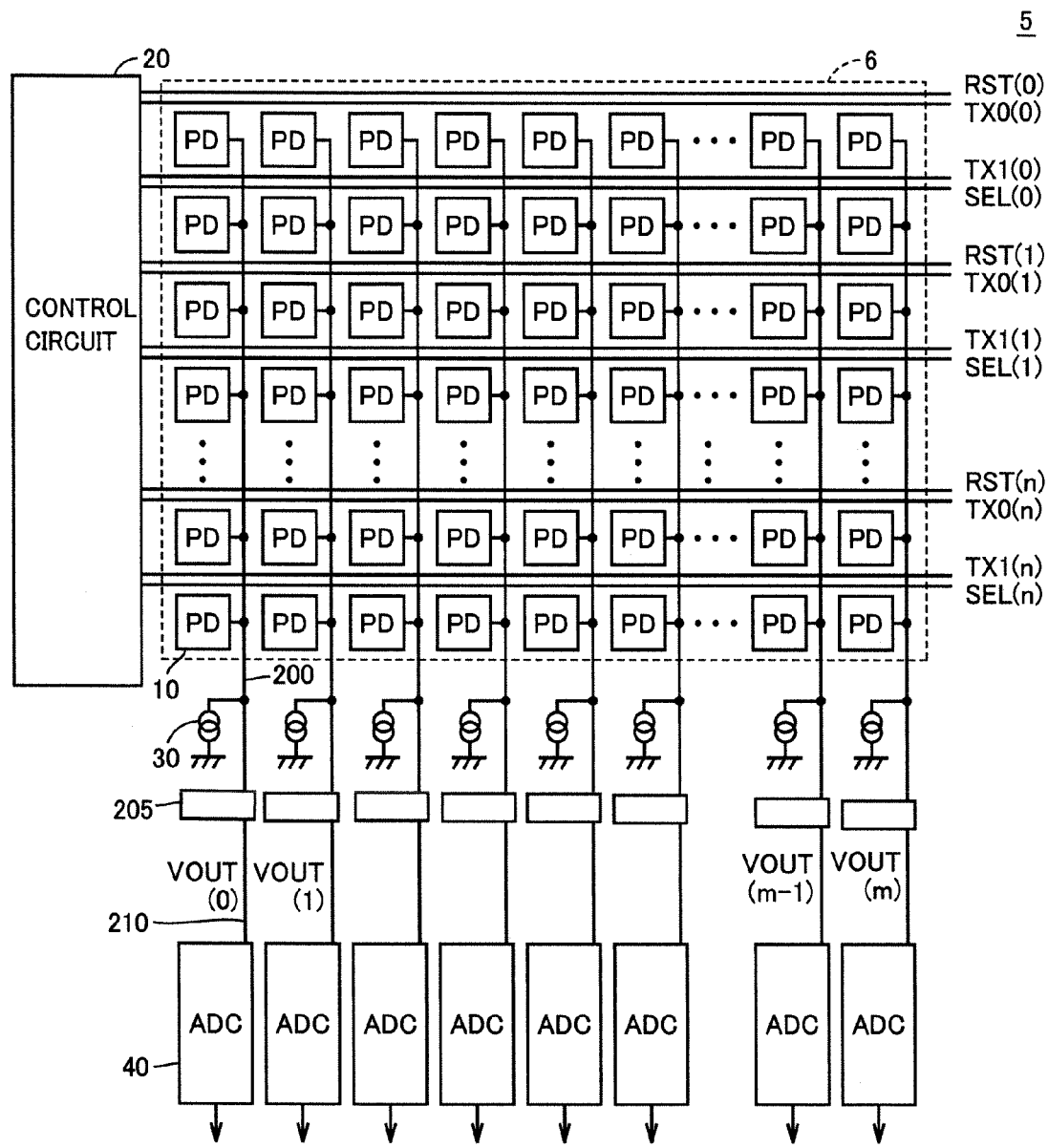
FIG. 1 is a schematic block diagram illustrating an overall configuration of a CMOS image sensor shown as a representative example of a solid-state imaging device in accordance with Embodiment 1 of the present invention.

FIG. 1 is a schematic block diagram illustrating an overall configuration of a CMOS image sensor 5 shown as a representative example of a solid-state imaging device in accordance with Embodiment 1 of the present invention.

Referring to FIG. 1, CMOS image sensor 5 includes: a plurality of light receiving elements 10 arranged in a matrix of rows and columns in a pixel array 6; a control circuit 20; and a constant current source 30 and an analog-digital converter (ADC) 40 arranged for each column of light receiving elements 10.

In the configuration example shown in FIG. 1, from the light receiving elements of a selected row, output signals in accordance with the amount of light received by the light receiving elements are read, in parallel at each column, from ADC 40.

FIG. 1 shows a configuration in which an output circuit is shared by two rows of light receiving elements 10 in each column. In the example of FIG. 1, light receiving elements 10 are arranged in a matrix of 2×(n+1) rows by (m+1) columns. Each light receiving element 10 is implemented by a photodiode (PD). The light receiving element generates charges in accordance with the amount of light received. The charges generated by the light receiving element are stored in a capacitance formed by the light receiving element.

Control circuit 20 outputs a reset signal RST and a selection signal SEL common to the two rows sharing the output circuit, and row selection signals TX0 and TX1 for selection between the two rows. For the entire 2×(n+1) rows of pixel array 6, RST (0) to RST (n), TX0 (0) to TX0 (n), TX1 (0) to TX1 (n) and SEL (0) to SEL (n) are output from control circuit 20.

Each signal is a binary signal having a logic low level (hereinafter simply denoted as "L level") and a logic high level (hereinafter also simply denoted as "H level"). The H-level time period of each signal is determined for a prescribed period such that successive scanning of rows is realized.

To (m+1) data lines 200 provided corresponding to respective columns, voltages in accordance with the amount of charges (that is, the amount of received light) stored in corresponding light receiving elements 10 are output from the light receiving elements 10 of the selected row, through a first output circuit, not shown.

In the solid-state imaging device in accordance with Embodiment 1, a second output circuit 205 is additionally provided for each column. These (m+1) second output circuits 205 are connected to a data line 200 and output output voltages VOUT (0) to VOUT (m), respectively.

ADC 40 converts output voltages VOUT (0) to VOUT (m) from second output circuits 205 to digital signals and outputs these. Thus, from CMOS image sensor 5 as a whole, as the rows are successively selected one by one, an output signal in accordance with the amount of light received by (m+1) light receiving elements 10 of one row is output from ADC 40.

The solid-state imaging device in accordance with Embodiment 1 has the second output circuits 205 added to a common configuration. A configuration not having the arrangement of second output circuits will be described as a comparative example.

Description of Problems of Comparative Example

Figure 2:
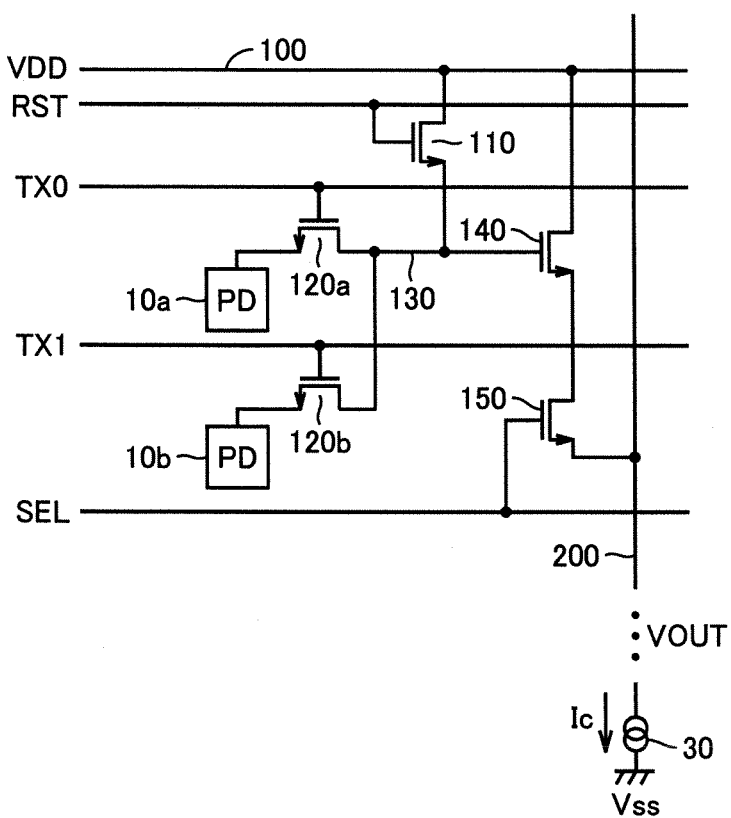
FIG. 2 is a circuit diagram showing a configuration for signal output from light receiving elements in accordance with a comparative example.

FIG. 2 is a circuit diagram illustrating a configuration of an output circuit from light receiving elements, in accordance with the comparative example. In the following, for the comparative example and the embodiments of the present invention, a so-called "2.5 transistor type configuration" having one output stage for two light receiving elements will be used for description.

Referring to FIG. 2, for two light receiving elements 10a and 10b, transfer transistors 120a and 120b are provided, respectively. Further, a reset transistor 110, a floating diffusion (hereinafter also simply denoted as FD) 130, an amplifying transistor 140 and a selection transistor 150 are provided, all shared by the two light receiving elements 10a and 10b.

Each transistor is typically implemented by an MOS transistor. In the CMOS image sensor, in order to attain high aperture ratio of light receiving element (photo diode), arrangement of a PMOS transistor is disadvantageous from the viewpoint of element structure. Therefore, preferably, each transistor is realized by an NMOS transistor.

Transfer transistor 120a is electrically connected between light receiving element 10a and FD 130. Similarly, transfer transistor 120b is electrically connected between light receiving element 10b and FD 130. Row selection signal TX0 is input to the gate of transfer transistor 120a. Similarly, row selection signal TX1 is input to the gate of transfer transistor 120b. In CMOS image sensor 5 shown in FIG. 1, the configuration for signal output is common to the two light receiving elements sharing the output stage. Therefore, in the following, the suffixes (0) to (n) and (0) to (m) appended to respective signals in FIG. 1 are omitted and the signals will be generally denoted.

Power supply line 100 supplies power supply voltage VDD. Power supply voltage VDD is generally input from the outside of CMOS image sensor 5. In the following, the potential generated by the connection to power supply line 100 is also denoted as VDD.

Reset transistor 110 is electrically connected between power supply line 100 and FD 130. Reset signal RST is input to the gate of reset transistor 110.

Amplifying transistor 140 and selection transistor 150 are electrically connected in series between power supply line 100 and a data line 200. In the example shown in FIG. 2, amplifying transistor 140 is connected between power supply line 100 and selection transistor 150, and selection transistor 150 is connected between amplifying transistor 140 and data line 200. Amplifying transistor 140 has its gate connected to FD 130. Selection signal SEL is input to the gate of selection transistor 150. Selection signal SEL is activated and kept at the H level for a prescribed time period when a row corresponding to TX0 or TX1 is selected. When selection signal SEL is set to the H level, the corresponding FD 130 is selected as an object of reading.

When selection transistor 150 is turned on by selection signal SEL, a constant current Ic is caused to flow to a path from power supply line 100 through amplifying transistor 140, selection transistor 150 that is on, and data line 200, by current source 30. As VSS in the figure, the ground voltage is generally applied.

Thus, a source-follower circuit that outputs a voltage in accordance with the potential of FD 130 (hereinafter also simply referred to as "FD potential") to data line 200 is formed by amplifying transistor 140, selection transistor 150 and current source 30. The source-follower circuit corresponds to the "first output circuit" not shown in FIG. 1. In the configuration of comparative example (FIG. 2), the second output circuit shown in FIG. 1 is not provided, and the output voltage VOUT in accordance with the potential of FD 130 is generated only by the first output circuit.

To one data line 200, a plurality of signal output configurations shown in FIG. 2 are connected. In the example of FIG. 1, (n+1) signal output configurations are connected to a common data line 200. By selection signals SEL (0) to SEL (n), an FD 130 as an object of reading is selected from among (n+1) FDs 130 corresponding to the common data line 200. By selectively activating selection signals SEL (0) to (n) to the H level, the first output circuit (source-follower circuit) including the selection transistor 150 that is turned on outputs the output voltage VOUT in accordance with the potential of selected FD 130 to data line 200.

In this manner, by the combination of row selection signals TX0 (0) to TX0 (n), TX1 (0) to TX1 (n) and selection signals SEL (0) to SEL (n), it is possible to successively select 2×(n+1) light receiving elements forming one row and to successively output the output voltage VOUT in accordance with the amount of charges stored in the selected light receiving elements 10 to common data line 200.

When exposed to light, light receiving elements 10a and 10b generate charges in accordance with the amount of light they received respectively. These charges are stored in light receiving elements 10a and 10b. By way of example, an operation of reading charges stored in light receiving element 10a will be described.

Before reading the charges from light receiving element 10a or 10b, reset signal RST is set to the H level to turn on reset transistor 110, so that the potential of FD 130 is reset to VDD.

When charges in light receiving element 10a are to be read, reset transistor 110 is turned off and, thereafter, row selection signal TX0 is set and kept at the H level for a prescribed time period, so that transfer transistor 120a is turned on. Thus, the charges that have been stored in light receiving element 10a are transferred to FD 130.

Consequently, the FD potential lowers by the potential in accordance with the amount of transferred charges, from the reset potential (VDD). The FD potential after charge transfer is output to data line 200 by the source-follower circuit (first output circuit) formed by amplifying transistor 140, selection transistor 150 and current source 30, when the selection signal SEL is at the H level. When selection signal SEL is at the L level, selection transistor 150 is turned off and hence the current path is shut off. Therefore, the source-follower circuit (first output circuit) is inoperative.

Similarly, the operation of reading charges from light receiving element 10b can be executed by successively activating and keeping at the H level the reset signal RST, row selection signal TX1 and selection signal SEL. In this manner, by the reset operation based on the reset signal RST, the transfer operation using row selection signals TX0 and TX1 and the selective operation of output circuit in accordance with the selection signal SEL, the output voltage VOUT in accordance with the amount of charges stored in the desired light receiving element 10 (that is, the amount of received light) can be output to data line 200.

The configuration for signal output shown in FIG. 2, however, has the following problem.

Generally, in CMOS image sensor 5, in order to ensure large opening area of light receiving element, back gates of CMOS transistors are commonly grounded. Therefore, if FD potential differs, source-substrate voltage of amplifying transistor 140 and selection transistor 150 becomes different at the time of output operation. This results in a phenomenon that the transistors come to have different threshold voltages Vth in accordance with the FD potential, because of body effect. Specifically, threshold voltages Vth of amplifying transistor 140 and selection transistor 150 become different when the FD potential is high (amount of received light is small) and when the FD potential is low (amount of received light is large). Specifically, Vth becomes higher when the FD potential is high (low illuminance) and Vth becomes lower when the FD potential is low (high illuminance) and, therefore, the gain of source-follower circuit equivalently viewed from the FD potential is decreased. As the FD potential is unstable as described above, the gain of source-follower circuit undesirably varies.

Further, the FD potential may also become unstable when resetting is insufficient. This leads to possible variation of gain. Specifically, if reset transistor 110 is not sufficiently turned on, the FD potential after resetting may fluctuate depending on the FD potential before resetting, possibly resulting in gain variation. In order to solve the problem of insufficient resetting, it is necessary to set the gate voltage of reset transistor 110 (potential difference between the ground potential and the gate potential), that is, the H level potential of reset signal RST, sufficiently higher than the power supply voltage VDD of the pixel. In a circuit structure using the boosted voltage of power supply voltage VDD, however, this approach leads to increased circuit scale and shorter device life, as described above.

The threshold voltage Vth of an MOS transistor can be represented by Equation (1) below, using the source-substrate voltage Vsb.

$$Vth = Vt0 + \gamma(\sqrt{(2\phi f + Vsb)} - \sqrt{(2\phi f)}) \quad (1)$$

$$\phi f = (kT/q)ln(N/ni)$$

In Equation (1), Vt0 represents the threshold voltage when Vsb=0. Further, γ is a coefficient (body effect coefficient) representing sensitivity of Vth to the change in Vsb. Further, φf is a constant determined by Boltzmann coefficient k, substrate temperature T, amount of charges of electrons q, impurity concentration N of the substrate and intrinsic carrier density ni of silicon.

As can be understood from Equation (1), since the root of source-substrate voltage (Vsb) has an influence on the threshold voltage because of the body effect, linearity between the FD potential and the output voltage VOUT is degraded.

Further, the H-level potential of selection signal SEL for turning on the selection transistor 150 is generally a fixed potential. Therefore, if the FD potential differs, the gate-source voltage (Vgs) of selection transistor 150 changes and, hence, on-resistance also changes. Specifically, the on-resistance becomes lower as Vgs becomes higher. Namely, when light receiving element 10 receives much light and the FD potential lowers, Vgs becomes lower and the on-resistance increases.

As described above, also by the phenomenon that the on-resistance of selection transistor 150 varies depending on the FD potential leads to lower gain and decreased linearity, as in the case of body effect described above.

Further, if the amount of light received by light receiving element 10 is small and the FD potential is high, selection transistor 150 comes closer to a saturated region if the potential difference from the H level of selection signal SEL is insufficient, and this significantly affects the linearity. The on-resistance Ron when the drain-source voltage (Vds) of MOS transistor is small can be represented by Equation (2) below, using gain coefficient β, threshold voltage (Vth) and gate-source voltage (Vgs) of the MOS transistor. From Equation (2), it is understood that the on-resistance of an MOS transistor is in inverse proportion to Vgs.

$$Ron = 1/(\beta \cdot (Vgs - Vth)) \quad (2)$$

As described above, there is a problem that the output characteristics when the FD potential is read to data line 200, that is, the linearity and gain of output voltage VOUT with respect to the FD potential, degrade because of the body effect and the difference in on-resistance depending on the difference in FD potential.

Here, in order to avoid the body effect, the source potential of each transistor and the substrate potential may be made the same. For this purpose, however, it becomes necessary to separate elements of transistors. This newly raises a problem that the aperture ratio of light receiving element (photo diode) decreases. Though the variation of on-resistance may be alleviated by increasing the H-level potential of selection signal SEL, the room for increasing the H-level potential is limited. Further, newly preparing a boosted voltage may lead to increased circuit scale or shorter device life, as in the case of gate voltage of reset transistor 110.

Description of Circuit Structure in Accordance with Embodiment 1

Figure 3:
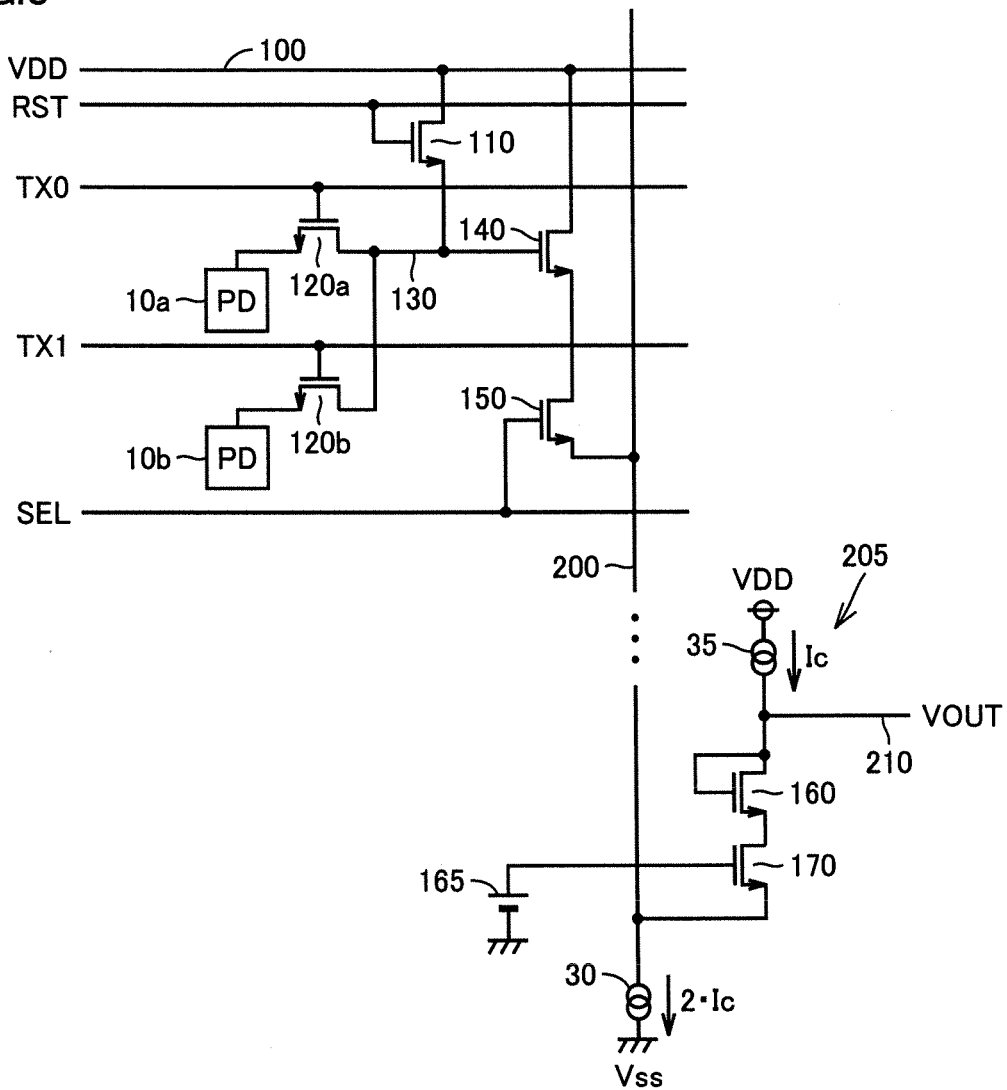
FIG. 3 is a circuit diagram showing a configuration for signal output from light receiving elements in accordance with Embodiment 1.

FIG. 3 is a circuit diagram showing a configuration for signal output from light receiving elements of a solid-state imaging device in accordance with Embodiment 1. Similar to FIG. 2, FIG. 3 shows a configuration corresponding to two light receiving elements 10a and 10b.

From the comparison between FIGS. 3 and 2, it can be seen that as in FIG. 2, for light receiving elements 10a and 10b, reset transistor 110, transfer transistors 120a and 120b, FD 130, amplifying transistor 140 and selection transistor 150 are provided. As described with reference to FIG. 2, by current source 30, amplifying transistor 140 and selection transistor 150, a source-follower circuit (first output circuit) driven by power supply voltage VDD for outputting the voltage in accordance with the FD potential to data line 200 is formed.

Further, in the solid-state imaging device in accordance with Embodiment 1, a second output circuit 205 connected to data line 200 is provided. The second output circuit 205 includes a current source 135, output transistors 160 and 170, and an output node 210. By way of example, the second output circuit 205 is provided for each data line 200 outside of pixel array 6, as shown in FIG. 1.

Output transistors 160 and 170 are electrically connected in series between data line 200 and output node 210. Output transistor 160 is provided in the same size and same shape as amplifying transistor 140. Output transistor 160 has its gate electrically connected to output node 210.

Output transistor 170 is provided in the same size and same shape as selection transistor 150. Output transistor 170 has its gate connected to a voltage source 165 for supplying the H-level potential of selection signal SEL. Current source 35 supplies a constant current Ic to a path through output node 210 and output transistors 160 and 170 to data line 200. By way of example, current source 35 drives data line 200 by power supply voltage VDD and thereby supplies the constant current Ic.

On the other hand, in Embodiment 1, current source 30 is adapted to supply a constant current 2·Ic. Specifically, current source 35 is formed to supply one half the amount of current of current source 30. As a result, it follows that the current Ic also flows through the first output circuit. Consequently, the amount of current flowing through amplifying transistor 140 and selection transistor 150 becomes equal to the amount of current flowing through output transistors 160 and 170. Further, selection transistor 150 and output transistor 170 having their sources connected to the same potential through data line 200 have the same gate potential. Further, in CMOS image sensor 5, the back gates of NMOS transistors are commonly grounded, as described in the foregoing.

Therefore, between selection transistor 150 and output transistor 170, the relation among the substrate potential, source potential and gate potential (Vsb and Vgs) is the same and the equal amount of current Ic flows therethrough. As a result, selection transistor 150 and output transistor 170 are in the same biased state.

Thus, the source-drain voltage of selection transistor 150 is the same as that of output transistor 170 and, hence, amplifying transistor 140 and output transistor 160 come to have the same source potential. Further, since the amount of current (Ic) of amplifying transistor 140 is the same as that of output transistor 160, amplifying transistor 140 comes to have the same gate-source voltage (Vgs) as output transistor 160. As a result, the potential of output node 210 connected to the gate of output transistor 160 becomes substantially the same as the FD potential.

Here, it is understood that between FD 130 and data line 200, a potential difference ΔV corresponding to the sum of Vgs of amplifying transistor 140 and Vds of selection transistor 150 generates, while between data line 200 and output node 210, equivalent potential difference ΔV generates, because of output transistors 160 and 170. Therefore, even when the potential difference ΔV derived from amplifying transistor 140 and selection transistor 150 varies depending on the FD potential, the second output circuit 205 can correct the potential difference in the opposite direction and output the output voltage VOUT in accordance with the FD potential to output node 210.

Thus, different from the voltage characteristics of data line 200 with respect to the FD potential, the characteristics of output voltage VOUT with respect to the FD potential come to have the variation depending on the FD potential eliminated. Accordingly, in the configuration for signal output in accordance with Embodiment 1 having the second output circuit 205, the output characteristics (linearity and gain) when the FD potential is read to data line 200 can be improved than in the comparative example.

Particularly, current source 35 can be formed by a single PMOS transistor and, therefore, the second output circuit 205 can be formed in a small and simple structure using three MOS transistors. Therefore, as compared with JP 2005-311487A, increase in size of CMOS image sensor 5 can be prevented.

In addition to degraded linearity, in the circuit configuration shown in FIGS. 2 and 3 in which a single FD 130 is shared by two light receiving elements 10a and 10b, if the current driving capability of reset transistor 110 is insufficient as, for example, the control voltage (gate voltage) is low, there arises a problem that the output of one light receiving element 10a affects the output of the other light receiving element 10b.

By way of example, assume that charges from light receiving element 10a are transferred to FD 130, a reading operation is executed and, thereafter, FD 130 is reset and then charges are transferred from light receiving element 10b. At this time, if the resetting is insufficient, the FD potential after resetting (reset potential) may vary dependent on the output from light receiving element 10a, and the output in the reading operation from light receiving element 10b may undesirably vary.

Figure 15A:
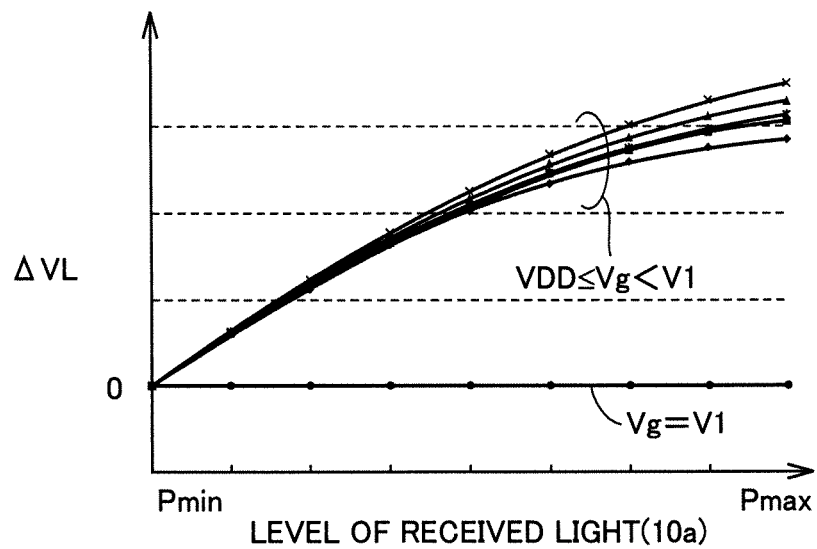
FIG. 15A is a graph representing a result of circuit simulation in accordance with the comparative example shown in FIG. 2.
Figure 15B:
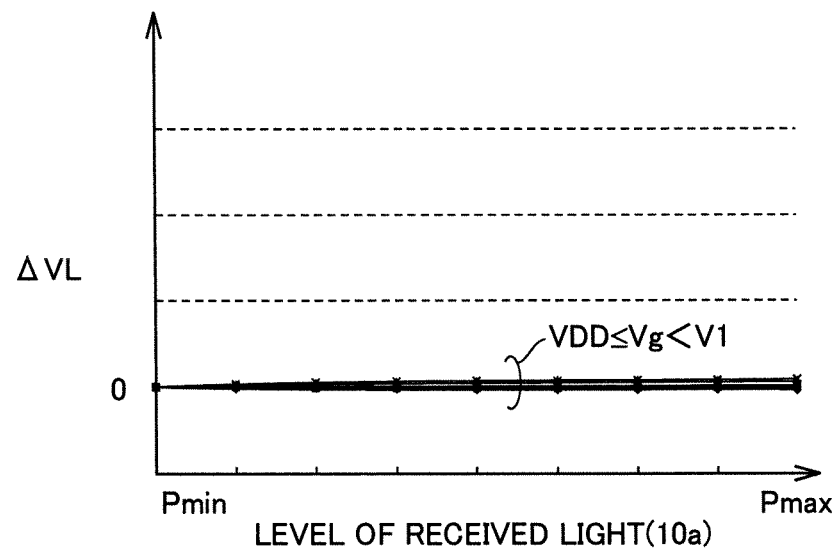
FIG. 15B is a graph representing a result of circuit simulation illustrating the effect of Embodiment 1.

Next, referring to FIGS. 15A and 15B, the effect of Embodiment 1, that is, the effect of the second output circuit will be described. In FIGS. 15A and 15B, behaviors of FD potential and output voltage VOUT when the reading operations from two light receiving elements 10a and 10b sharing a common FD 130 are executed with a reset operation interposed are simulated, using a circuit simulator, by setting element constants of each transistor.

FIGS. 15A and 15B each show characteristics of change in output level, in the reading operation from light receiving element 10b with respect to the level of light received by light receiving element 10a.

First, the level of received light (amount of received light) of light receiving element 10a was set, and the circuit operation (change of voltage at various portions) when the amount of charges corresponding to the level of received light was output to FD 130 was found by a circuit simulator. From this state, the circuit operation (change of voltage at various portions) when the control voltage (gate voltage) Vg of reset transistor 110 was applied to reset the FD potential and thereafter the reading operation from light receiving element 10b was executed was further simulated. Here, the level of light received by light receiving element 10b was fixed at a constant value while the level of light received by light receiving element 10a was changed, and the change in output in the operation of reading the constant value from light receiving element 10b was simulated.

FIG. 15A shows the result of simulation of the configuration shown in FIG. 2 (comparative example), that is, the circuit configuration not provided with the second output circuit. On the other hand, FIG. 15B shows the result of simulation of the configuration shown in FIG. 3 (Embodiment 1), that is, the circuit configuration provided with the second output circuit.

In the simulations shown in FIGS. 15A and 15B, what is evaluated is an output level VL of the reading operation when the same amount of charges were output from light receiving element 10b to FD 130, after the reading from light receiving element 10a was finished and the FD potential was reset by turning on reset transistor 110. The output level VL corresponds to the amount of change in voltage calculated by subtracting, from the output voltage VOUT after resetting (when reset transistor 110 is turned off) and before the reading operation from light receiving element 10b, the output voltage VOUT after the transfer of charges from light receiving element 10b to FD 130.

The abscissa of FIGS. 15A and 15B represent the level of light received by light receiving element 10a. In FIGS. 15A and 15B, the ordinate represents the amount of change ΔVL of output level VL from a reference value when the level of light received by light receiving element 10a changes, with the reference value being the output level VL in a reading operation when the level of light received by light receiving element 10a is the smallest (Pmin).

When the level of light received by light receiving element 10a is the smallest (Pmin), the FD potential after reading from light receiving element 10a remains at the reset potential and, therefore, the FD potential after resetting by reset transistor 110 is the reset potential. Namely, FD 130 is fully reset. The output level VL in the reading operation from light receiving element 10b after the full resetting is used as the reference value mentioned above.

FIGS. 15A and 15B both show the characteristics of the amount of change ΔVL from the reference value of output level at the time of reading from light receiving element 10b with respect to the change in level of light received by light receiving element 10a while the control voltage was changed variously, with the control voltage (gate voltage) when reset transistor 110 is on used as a parameter.

Referring to FIG. 15A, when the level of light received by light receiving element 10a is the smallest (Pmin), ΔVL=0 from the definition above. When the amount of light received by light receiving element 10a increases, the FD potential at the time of reading decreases accordingly. Therefore, when the FD potential is reset by reset transistor 110 after reading from light receiving element 10a, if it is not fully reset because of insufficient control voltage Vg (gate voltage), the FD potential after resetting becomes lower than the original FD potential (VDD). The decrease is more significant if the FD potential before resetting is lower (that is, if the amount of light received by light receiving element 10a is larger).

When reading from light receiving element 10b starts with the low reset potential, the FD potential becomes lower for the same output charges. As described above, the channel length modulation effect of amplifying transistor 140 and the on-resistance of selection transistor 150 depend on the voltage. Therefore, the gain of source-follower circuit may possibly change depending on the input potential, that is, the FD potential. Thus, the output level VL that should be constant for reading the same amount of light (that is, for transferring the same amount of charges) may possibly vary depending on the amount of charges read from light receiving element 10a (that is, the amount of light received by light receiving element 10a) before the resetting operation. FIGS. 15A and 15B show the results of simulation of such a phenomenon.

The simulation shows that with the control voltage in the range of VDD≤Vg<V1, current driving capability of reset transistor 110 is insufficient as described above and, therefore, the FD potential after resetting varies in accordance with the level of light received by light receiving element 10a and, as a result, the output level VL also varies. Specifically, the simulation results show that when larger amount of light is received by light receiving element 10a and the FD potential after resetting operation becomes lower, the output level VL becomes higher (that is, the difference ΔVL increases). In other words, the level of light received by light receiving element 10a has an influence on the reading operation from light receiving element 10b.

On the other hand, by increasing the gate voltage of reset transistor 110, the variation in FD potential after resetting can be prevented. In the example shown in FIG. 15A, the simulation result shows that by increasing the voltage to Vg>V1, the output level VL in the operation of reading the same amount of light from light receiving element 10b can be made substantially constant (that is, ΔVL=0), independent of the level of light received by light receiving element 10a.

From the result of simulation shown in FIG. 15A, it can be understood that in the configuration of FIG. 2 (comparative example), in order to correctly read the amount of light received by light receiving element 10b independent of the level of light received by light receiving element 10a, it is necessary to increase the power supply voltage VDD to generate the control voltage (gate voltage) Vg of reset transistor 110.

Referring to FIG. 15B, the simulation result shows that in the configuration shown in FIG. 3, because of the effect attained by the second output circuit, even when the control voltage of reset transistor 110 is in the range lower than V1, the output level VL does not vary (that is, $\Delta VL=0$) independent of the level of light received by light receiving element 10a, as in the case of Vg>V1 in the example of FIG. 15A.

As can be understood from the simulation results, according to Embodiment 1, the variation of biased state of amplifying transistor 140 and selection transistor 150 caused by the variation in FD potential after resetting can be reflected on the biased state of output transistors 160 and 170 of the second output circuit. Therefore, the amount of light received by light receiving element 10b can accurately be read independent of the level of light received by light receiving element 10a, without increasing the control voltage (gate voltage) Vg of reset transistor 110.

As described above, by the configuration in accordance with Embodiment 1, it is possible to improve the output characteristics (linearity and gain) of each unit of light receiving element and, in addition, to improve the accuracy of reading from a plurality of light receiving elements 10a and 10b sharing the same FD 130, without using a boosted voltage as the control voltage Vg of reset transistor 110.

Modification 1 of Embodiment 1

Figure 4:
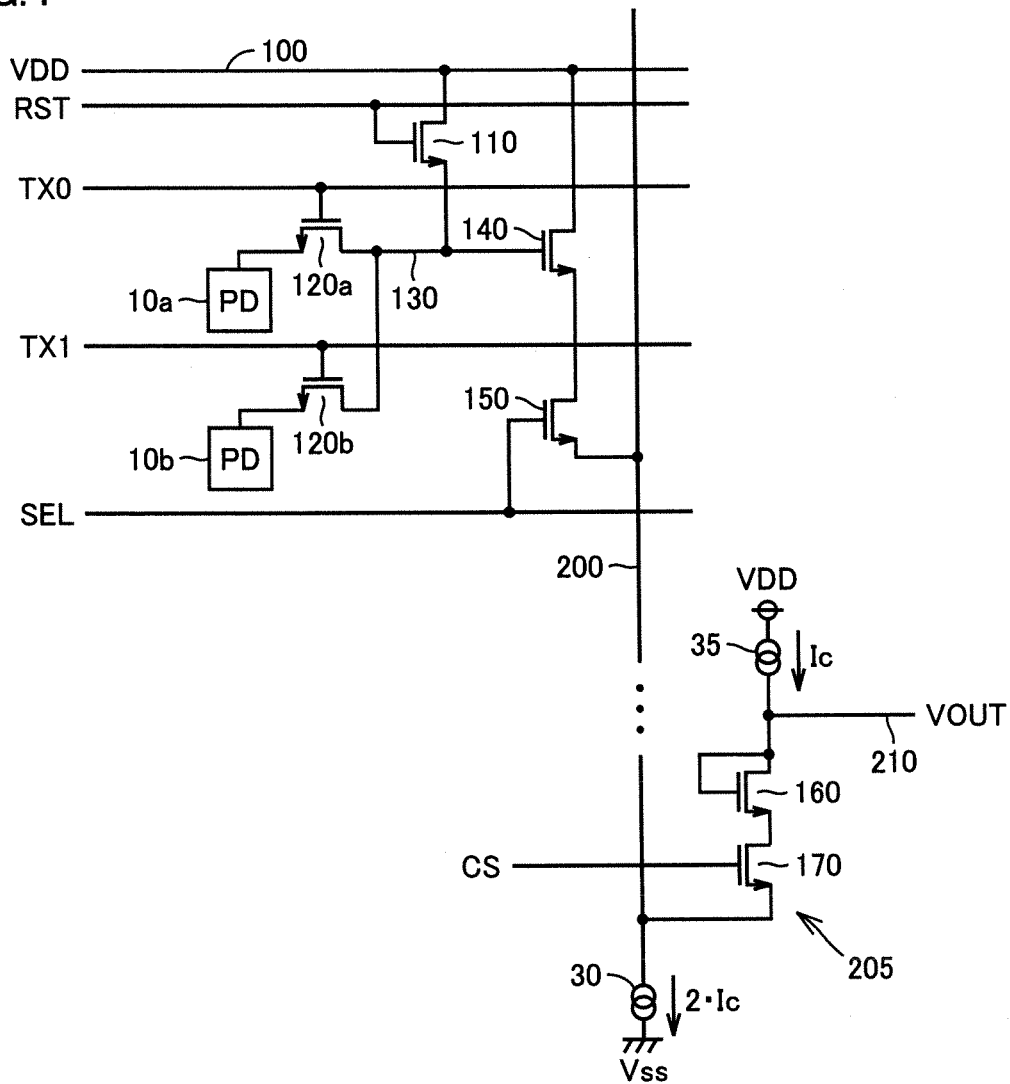
FIG. 4 is a circuit diagram showing a configuration for signal output from light receiving elements in accordance with Modification 1 of Embodiment 1.

FIG. 4 is a circuit diagram showing a configuration for signal output from light receiving elements in accordance with Modification 1 of Embodiment 1.

From the comparison between FIGS. 4 and 3, it can be seen that Modification 1 of Embodiment 1 differs in that a control signal CS is input to the gate of output transistor 170 corresponding to selection transistor 150. Control signal CS is set to attain, when set to the H level, the same H-level potential as the selection signal SEL. In FIG. 4, arrangement of other portions is the same as that of FIG. 3 and, therefore, detailed description thereof will not be repeated.

Figure 5:
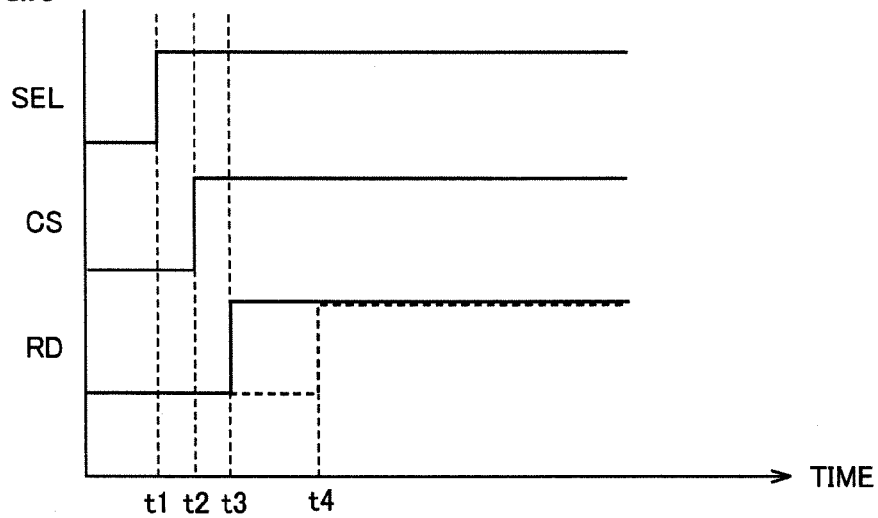
FIG. 5 is a diagram of signal waveforms illustrating activation timing of the control signal shown in FIG. 4.

FIG. 5 is a diagram of signal waveforms illustrating the timing of activating control signal CS.

Referring to FIG. 5, in the configuration for signal output shown in FIG. 4, by activating selection signal TX0 or TX1, the selection signal SEL is activated to the H level at time t1, with the charges having been transferred to FD 130 from light receiving element 10a or 10b.

Consequently, to read the potential of FD 130 corresponding to selection signal SEL, the source-follower circuit formed by amplifying transistor 140, selection transistor 150 turned on by selection signal SEL and current source 30 (2·Is) operates. As a result, the voltage of data line 200 changes to the level in accordance with the FD potential, or more accurately, to the level of FD potential with a potential difference $\Delta V$ caused by amplifying transistor 140 and selection transistor 150.

Here, the voltage of data line 200 is driven by the amount of current 2·Ic provided by current source 30. Therefore, the settling time until the voltage of data line 200 stabilizes becomes shorter than when the data line 200 is driven with the amount of current Ic in the example of FIG. 3.

Then, at time t2, the control signal CS is set to the H level and thereby the second output circuit 205 starts the same operation as in Embodiment 1. Thus, the output voltage VOUT in accordance with the FD potential with the potential difference $\Delta V$ cancelled, is output to output node 210. By setting the time t2, that is, the difference of timing to activate selection signal SEL and control signal CS such that the second output circuit 205 starts its operation after the voltage of data line 200 is stabilized, it is possible to stabilize the output voltage VOUT earlier. Therefore, the reading signal RD for taking in the output voltage VOUT to ADC 40 can be set to the H level at time t3.

In contrast, in the same state as in Embodiment 1 in which the control signal CS is fixed at the H level, each of data line 200 and output node 210 will be driven by the amount of current Ic (2Ic−Ic), by setting the selection signal SEL to the H level. Therefore, the voltage of data line 200 and output voltage VOUT change together. Data line 200 is an interconnection passing through pixel array 6 vertically and, therefore, it tends to have a larger parasitic capacitance. Thus, it takes time until the voltage of data line 200 is stabilized. Thus, the timing of stabilizing the output voltage VOUT may be delayed. For example, it may become necessary to delay the timing of setting the read signal RD to the H level until time t4 of FIG. 5.

As described above, in the configuration for signal output in accordance with a modification of Embodiment 1, in addition to the effect of improving output characteristics as attained by Embodiment 1, it becomes possible to realize high-speed signal output operation from a light receiving element, since the output voltage VOUT can be stabilized quickly even when the data line 200 has a large parasitic capacitance.

Modification 2 of Embodiment 1

Figure 6:
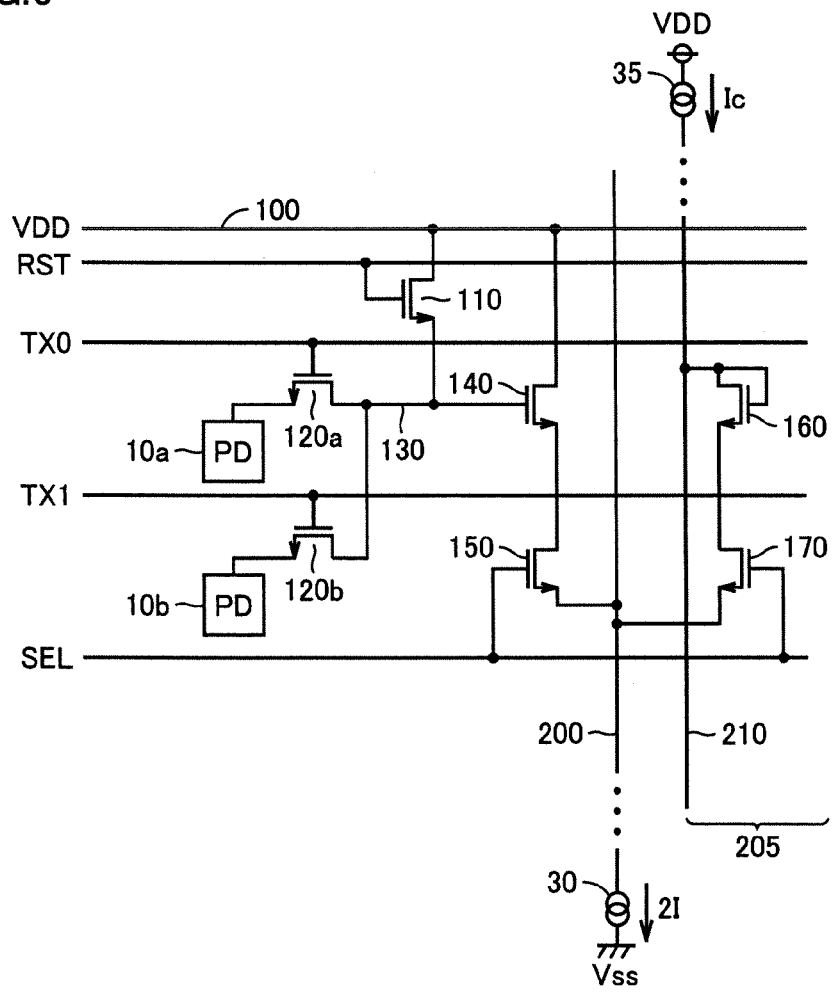
FIG. 6 is a circuit diagram illustrating a configuration for signal output from light receiving elements in accordance with Modification 2 of Embodiment 1.

FIG. 6 is a circuit diagram illustrating a configuration for signal output from light receiving elements in accordance with Modification 2 of Embodiment 1.

From the comparison between FIGS. 6 and 3, it can be seen that Modification 2 of Embodiment 1 differs in that output transistors 160 and 170 forming the second output circuit 205 are arranged in pixel array 6. Thus, output transistors 160 and 170 are arranged close to amplifying transistor 140 and selection transistor 150. Specifically, output transistors 160 and 170 are arranged at every two rows corresponding to each of the first output circuits, in each column. To the gate of output transistor 170, the selection signal SEL common to selection transistor 150 is input. In FIG. 6, arrangement of other portions is the same as that of FIG. 3 and, therefore, detailed description thereof will not be repeated.

In the configuration in accordance with Modification 2 of Embodiment 1, output transistor 160 and amplifying transistor 140 and output transistor 170 and selection transistor 150 are arranged close to each other. Thus, difference in element characteristics derived from manufacturing variations between the transistors can be reduced.

As a result, the potential difference caused by amplifying transistor 140 and selection transistor 150 and the potential difference caused by output transistors 160 and 170 can further be equalized. Therefore, while the number of arranged output transistors 160 and 170 increases, the effect of improving the output characteristics attained by the configuration of Embodiment 1 can further be increased.

In the configuration in accordance with Modification 2 of Embodiment 1, selection between the second output circuits 205 also becomes necessary and, therefore, it is necessary to control on/off of output transistor 170. In the configuration shown in FIG. 6, the control signal CS similar to that of Modification 1 of Embodiment 1 may be input to the gate of output transistor 170. In that case, it is possible to generate the control signal CS by delaying the selection signal SEL for a prescribed time period (corresponding to the time difference between t1 and t2 of FIG. 4).

In Embodiment 1 and in Modifications 1 and 2 thereof, a so-called 2.5 transistor type configuration in which FD 130, amplifying transistor 140 and selection transistor 150 are shared by two (two rows of) light receiving elements 10 of the same row has been described as an example. Here, it is described for confirmation that even in a configuration having FD 130, amplifying transistor 140 and selection transistor 150 arranged for each light receiving element 10, comparable functions and effects can be attained by connecting the second output circuit 205 in accordance with Embodiment 1 and its modifications to data line 200.

Further, the configuration of the output stage (first output circuit) formed by amplifying transistor 140 and selection transistor 150 is not limited to the examples shown in FIGS. 3, 4 and 6. Specifically, as long as the second output circuit 205 is configured such that a transistor in the same biased state as the first output circuit is connected between data line 200 and output node 210 so that the same potential difference as the potential difference ΔV between FD 130 and data line 200 caused by the first output circuit generates between data line 200 and output node 210, the effect of improving the output characteristics described with reference to Embodiment 1 and its modifications can similarly be attained without any limitation to the configuration of first output circuit.

Embodiment 2

Variation of Reset Potential

Another factor that degrades the output characteristics of CMOS image sensor is the variation of reset potential. This problem will be described, again referring to the comparative example shown in FIG. 2.

Again referring to FIG. 2, the FD potential is reset to VDD when reset transistor 110 is turned on with the reset signal RST at the H level.

Here, reset transistor 110 is formed of an NMOS transistor. Therefore, if the H level potential of reset signal RST is the same as VDD, the current supplied by reset transistor 110 from power supply line 100 to FD 130 decreases significantly, when the FD potential increases close to (VDD−Vth). Therefore, it takes long time until the FD potential is fully converged. On the other hand, if the reset time is limited considering the desire for higher speed of operation, the FD potential at the end of resetting may vary. As a result, the FD potential after the reset operation (reset potential) may possibly vary, depending on the FD potential before resetting.

As described above, in the 2.5 transistor type configuration such as shown in FIG. 2, a common FD 130 is shared by two light receiving elements 10a and 10b and, therefore, after the output operation of output voltage VOUT in accordance with the amount of charges transferred from light receiving element 10a to FD 130, the FD potential is immediately reset and the transfer operation from light receiving element 10b to FD 130 is executed. Here, the FD potential before resetting differs depending on the amount of light received by light receiving element 10a. Further, typically, capacitance component of FD 130 includes parasitic capacitance component of transistors and, therefore, it depends on voltage. For this reason, the capacitance value varies because of the difference in FD potential before resetting.

Further, the source-follower circuit formed by amplifying transistor 140, selection transistor 150 and current source 30 also has a characteristic that its gain changes depending on the output voltage. The voltage dependency is caused, for example, by the variation of threshold voltage derived from body effect and the variation of on-resistance of selection transistor 150 as described with reference to Embodiment 1.

Considering such voltage dependencies, it is possible that the same output voltage VOUT cannot be generated for the same amount of light received by light receiving element 10 because of the variation in reset potential, unless the FD potential is fully reset. Particularly, if the FD potential is close to VDD, it is difficult to fully ensure the gate-source voltage of selection transistor 150 at the time of output operation even if the reset time is sufficient. As the on-resistance increases, the output voltage to data line 200 decreases. Thus, the gain of output voltage VOUT with respect to the FD potential varies in accordance with the difference of reset potential, and the output linearity degrades.

In order to avoid such a problem, it may be possible to generate the H-level potential of reset signal RST from a boosted voltage of power supply voltage VDD. Provision of a structure for boosted voltage, however, possibly leads to undesirable increase of circuit scale.

Further, in the configuration shown in FIG. 2, the power supply of source-follower circuit (first output circuit) formed by amplifying transistor 140, selection transistor 150 and current source 30 and the power supply for resetting are common, as they share the power line 100. Accordingly, it is also possible that the reset potential varies among light receiving elements 10 depending on the position in pixel array 6, due to the influence of voltage drop over power line 100. If the number of light receiving elements is increased in pixel array 6 to realize higher image definition, this problem will be more significant.

Figure 7:
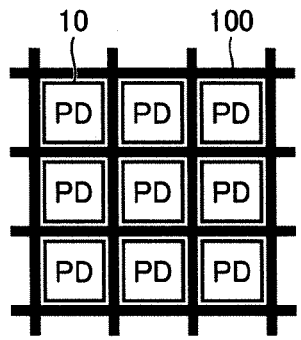
FIG. 7 is a schematic illustration showing an exemplary configuration for lowering impedance of a power supply line.

As a countermeasure for such a voltage drop, the power supply impedance of VDD can be lowered by providing power line 100 in a mesh, as shown in FIG. 7. Such an approach, however, has a physical limit. Further, unless the impedance of VDD is sufficiently low, the voltage drop of VDD caused at the time of operation of source-follower circuit possibly leads to an operation of amplifying transistor 140 in the non-saturation region, because of the decrease of gate-drain voltage. In that case, the linearity of output voltage VOUT with respect to the FD potential will be significantly degraded.

It is also possible to prevent the voltage drop by reducing the amount of current provided by current source 30 of source-follower circuit. If the amount of current is reduced, however, the time period until the output voltage VOUT is settled becomes longer, resulting in a new problem that the speed of operation cannot be improved.

As described above, the variation of reset potential leads to lower output characteristics and, therefore, it is necessary to stabilize the reset potential while avoiding increase in circuit scale and not hindering improvement of operation speed.

Description of Circuit Structure in Accordance with Embodiment 2

Figure 8:
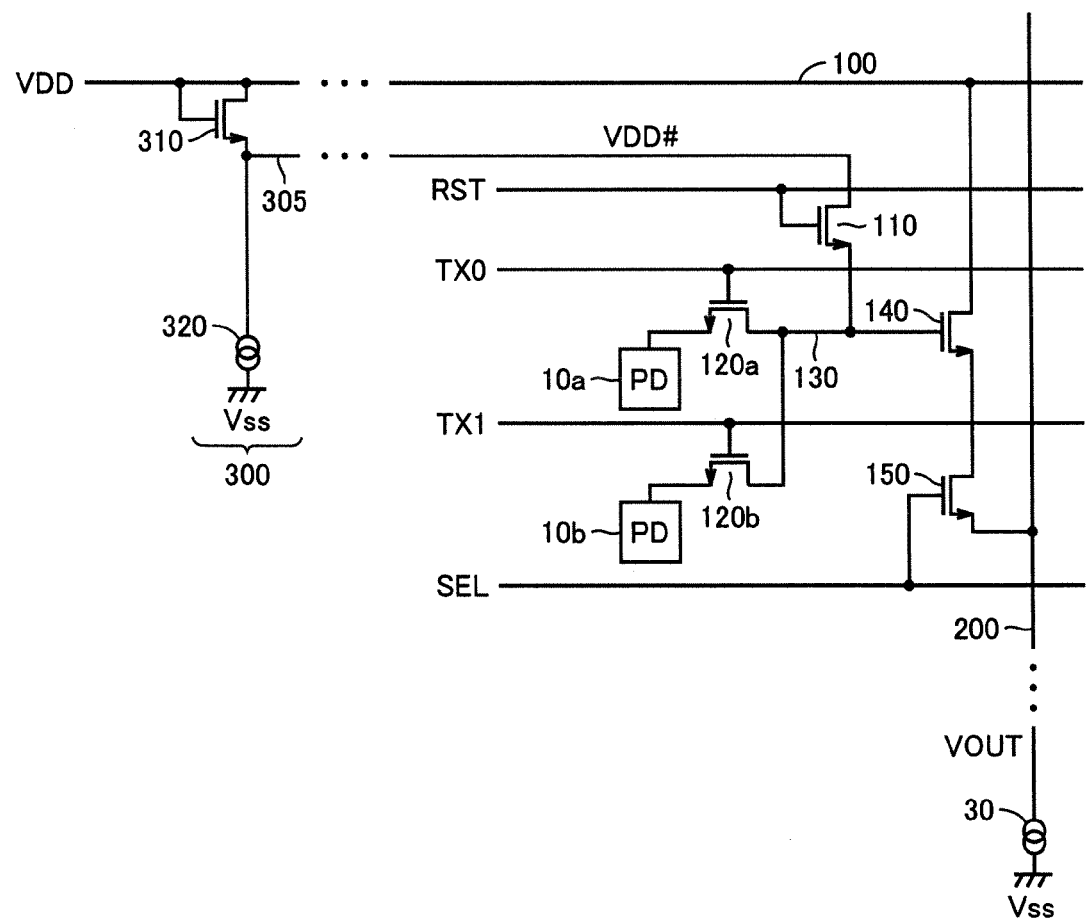
FIG. 8 is a circuit diagram illustrating a configuration for signal output from light receiving elements in accordance with Embodiment 2.

FIG. 8 is a circuit diagram illustrating a configuration for signal output from light receiving elements in accordance with Embodiment 2.

From the comparison between FIGS. 8 and 2, it can be seen that the configuration in accordance with Embodiment 2 differs from the configuration of comparative example shown in FIG. 2 in that a reset voltage generating circuit 300 is newly provided and that reset transistor 110 is connected between a reset voltage line 305 and FD 130. To reset voltage line 305, a reset voltage VDD# is output from reset voltage generating circuit 300. In FIG. 8, arrangement of other portions is the same as that of FIG. 2 and, therefore, detailed description thereof will not be repeated. In the following, the potential generated by the connection to reset voltage line 305 will be also denoted as VDD#.

Reset voltage generating circuit 300 has an NMOS transistor 310 and a current source 320 connected between power supply line 100 and the ground node (VSS). Transistor 310 is electrically connected between power supply line 100 and reset voltage line 305. Transistor 310 has its gate connected to power supply line 100.

Thus, reset voltage VDD# output to reset voltage line 305 becomes a voltage (VDD−Vth) lowered by the threshold voltage Vth of transistor 310 from the power supply voltage VDD. By reset voltage generating circuit 300, the reset voltage VDD# as the power source for reset transistor 110 is separated from the power supply voltage VDD of the source-follower circuit (first output circuit) including amplifying transistor 140. Specifically, transistor 310 corresponds to a "voltage lowering transistor."

Only a transient current flows through reset transistor 110 in the H-level period of reset signal RST and, therefore, a steady DC current does not flow therethrough. Consequently, the voltage drop of reset voltage VDD# accompanying the reset operation does not have the DC component. Therefore, by ensuring successive reset intervals of respective FDs 130 appropriately, it is possible to prevent variation of reset potential among light receiving elements 10 depending on the position in pixel array 6, by the voltage drop at reset voltage line 305.

Further, since reset voltage VDD#=VDD−Vth, even when the H-level potential of reset signal RST input to the gate of reset transistor 110 is generated from power supply voltage VDD, Vgs of reset transistor 110 can be made equal to or higher than Vth. As a result, during the time period from turning-on of reset transistor 110 to the end of resetting of FD potential with reset voltage VDD#, sufficient current can be supplied by reset transistor 110. Therefore, it is possible to reduce the time for resetting and to prevent variation of reset potential depending on the FD potential before resetting, without the necessity of providing a mechanism for boosting power supply voltage VDD.

By the reset voltage VDD#, the range of FD potential comes to the lower potential side than VDD−Vth. Therefore, even when the H-level potential of selection signal SEL to be input to the gate of selection transistor 150 is generated from power supply voltage VDD, selection transistor 150 can fully be turned on. Further, since the gate-drain voltage of amplifying transistor 140 is widened, the margin for maintaining an operation in the saturated region of amplifying transistor 140 with respect to the voltage drop of power supply voltage VDD is also increased. As a result, low-impedance requirement of power supply line 100 can be eased to some extent.

As described above, in the configuration for signal output in accordance with Embodiment 2, by the voltage lowering circuit (reset voltage generating circuit 300) of a simple structure provided inside CMOS image sensor 5, the variation of reset potential of FD 130 can be prevented without any structure for boosting. As a result, variation in output characteristics can be prevented through stabilization of reset potential, without causing increase in circuit scale or hindering high speed operation of CMOS image sensor 5.

It is noted that the reset voltage VDD# changes following the threshold voltage Vth of NMOS transistor 310. Therefore, even when Vth of each NMOS transistor including NMOS transistor 310 changes because of temperature or variation of wafer process, voltage difference between VDD# (VDD−Vth) and Vth of each MOS transistor can be ensured and, therefore, stable output characteristics can be obtained.

Figure 16:
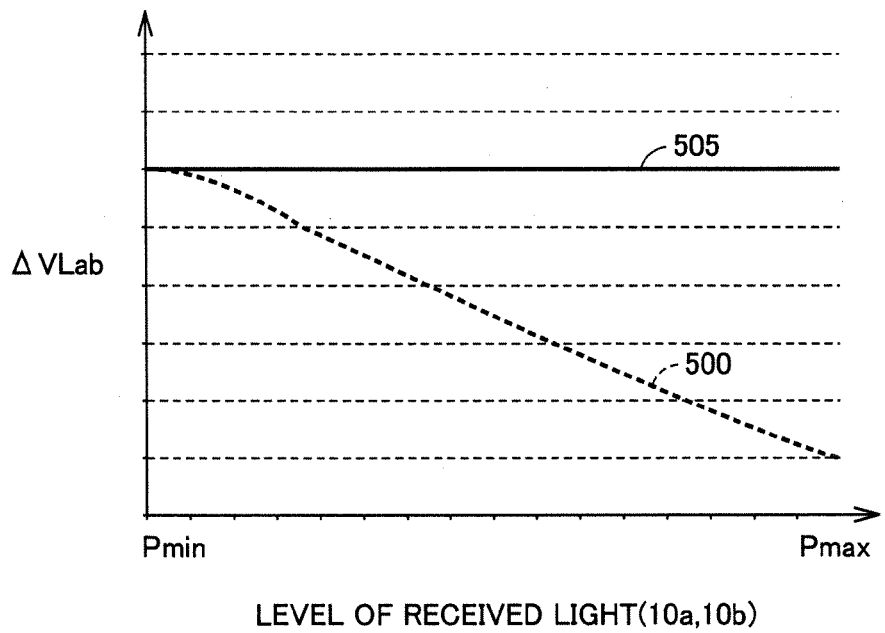
FIG. 16 is a graph representing a result of circuit simulation illustrating the effect of Embodiment 2.

FIG. 16 is a graph representing a result of simulation illustrating the effect of Embodiment 2.

In FIG. 16 also, behaviors of FD potential and output voltage VOUT when the reading operations from two light receiving elements 10a and 10b sharing a common FD 130 are executed with a reset operation interposed are simulated by a circuit simulator, by setting element constants of each transistor. Specifically, the levels of light received by light receiving elements 10a and 10b were set to be the same, and output level VL defined in the same manner as in the examples of FIGS. 15A and 15B was simulated at the time of reading from light receiving element 10a and at the time of reading from light receiving element 10b, respectively.

In FIG. 16, the ordinate represents an output level difference ΔVLab (ΔVLab=VLa−VLb) between the output level VL (a) at the time of reading from light receiving element 10a and the output level VL(b) at the time of reading from light receiving element 10b. Since the level of light received by light receiving elements 10a and 10b is set to be the same, originally, there is a relation of ΔVLab=0. The abscissa of FIG. 16 shows the levels of light received by light receiving elements 10a and 10b.

In the example of FIG. 16, in each of the comparative example (FIG. 2) and Embodiment 2 (FIG. 8), the reading operation when the control voltage Vg (H-level potential of reset signal RST) of reset transistor 110 is set to VDD is simulated. The characteristic line 500 plotted in a dotted line represents the result of simulation for the configuration of comparative example (FIG. 2), and the characteristic line 505 plotted in a solid line represents the result of simulation for the configuration of Embodiment 2 (FIG. 8).

In the comparative example (FIG. 2), the reset voltage is of the same level (VDD) as the control voltage Vg of reset transistor 110 and, therefore, when the FD potential after reading from light receiving element 10a becomes lower as the amount of received light increases, it becomes difficult to sufficiently reset the FD potential. As a result, as indicated by the characteristic line 500 (dotted line), in a range where the amount of received light is large, the output level VL in the reading operation from light receiving element 10b after resetting becomes larger than in the region where the amount of received light is small. Specifically, as the amount of received light increases, ΔVLab increases in the negative direction. In other words, the reading operation from light receiving element 10b after resetting involves an error depending on the amount of received light.

In contrast, according to Embodiment 2 (FIG. 8), the control voltage Vg (Vg=VDD) of reset transistor 110 is higher than the reset voltage VDD# and, therefore, the FD potential can fully be reset even when the amount of light received by light receiving element 10a is large. As a result, it becomes possible to have the output level VL substantially constant (that is, to make ΔVLab substantially 0) independent of the amount of received light, as indicated by characteristic line 505 (solid line). Specifically, it can be understood from the simulation results shown in FIG. 16 that the error in reading operation from light receiving element 10b after resetting can be eliminated.

Modification 1 of Embodiment 2

Figure 9:
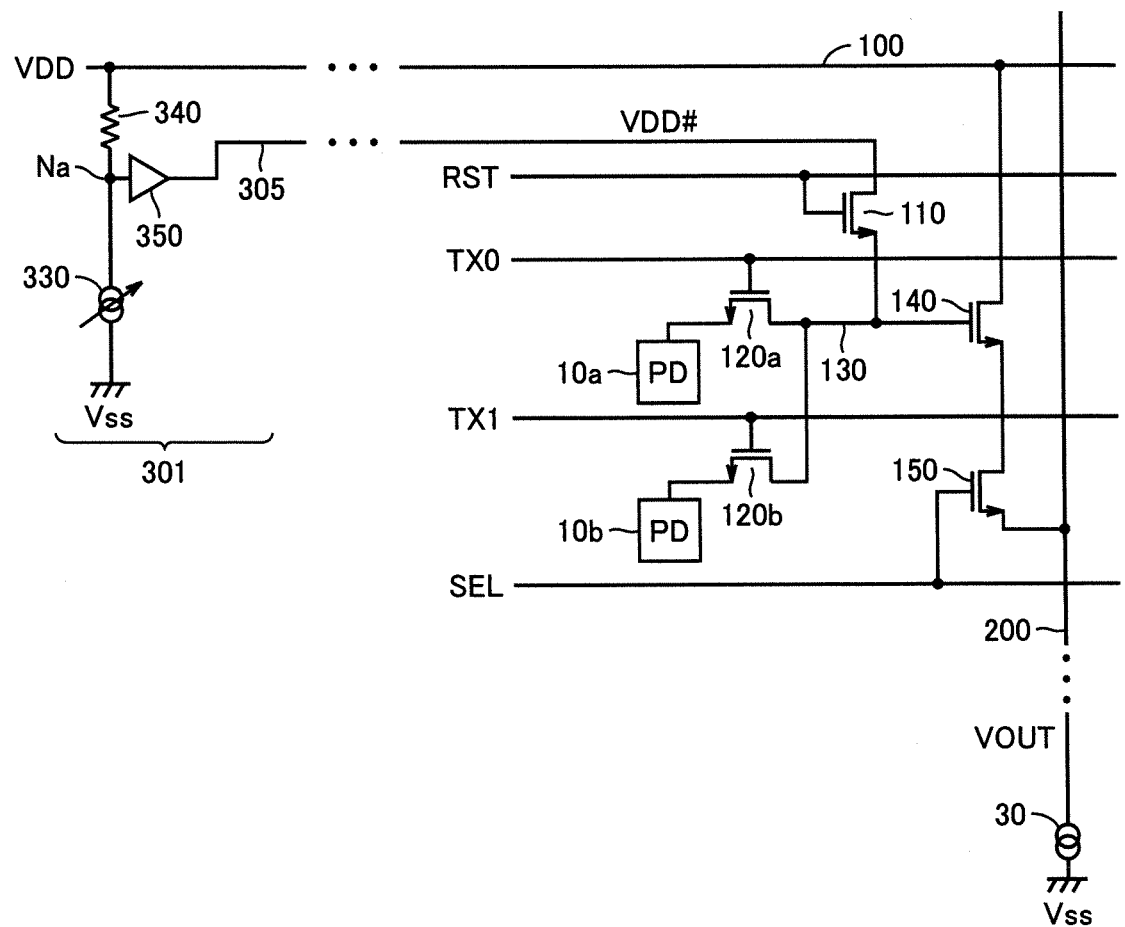
FIG. 9 is a circuit diagram illustrating a configuration for signal output from light receiving elements in accordance with Modification 1 of Embodiment 2.

FIG. 9 is a circuit diagram illustrating a configuration for signal output from light receiving elements in accordance with Modification 1 of Embodiment 2.

From the comparison between FIGS. 9 and 8, it can be seen that the configuration in accordance with Modification 1 of Embodiment 2 differs in that a reset voltage generating circuit 301 is provided in place of reset voltage generating circuit 300 shown in FIG. 8.

Reset voltage generating circuit 301 has a variable current source 330, a resistance element 340, and a buffer 350. Variable current source 330 and resistance element 340 are connected in series through a node Na. Buffer 350 supplies the reset voltage VDD# to reset voltage line 305 in accordance with the voltage at node Na. In FIG. 9, arrangement of other portions is the same as that of FIG. 8 and, therefore, detailed description thereof will not be repeated.

The voltage at node Na, that is, the reset voltage VDD# can be represented as VDD#=VDD−Iv·R, where Iv represents the amount of current supplied by variable current source 330 and R represents the resistance value of resistance element 340. Specifically, reset voltage generating circuit 301 can variably set the reset voltage VDD# by changing the amount of current Iv from variable current source 330. Thus, a "voltage control circuit" for variably controlling reset voltage VDD# is formed by variable current source 330 and resistance element 340.

The configuration for variably setting reset voltage VDD# is not limited to the example shown in FIG. 9, and various other configurations may be applied. By way of example, since no constant current flows through reset transistor 110, the output impedance of reset voltage generating circuit 301 may not be made very small. Therefore, arrangement of buffer 350 may be omitted.

In the configuration in accordance with Modification 1 of Embodiment 2, reset voltage VDD# may be adjusted at the time of manufacturing, in accordance with the type or usage of CMOS image sensor 5. By such an adjustment, it becomes possible to have a common circuit design for generating the reset voltage VDD# among a plurality of different types of devices.

Alternatively, it is also possible to change the reset voltage VDD# in accordance with the status of use of CMOS image sensor 5. By way of example, the reset voltage VDD# may be changed in accordance with ISO sensitivity. Specifically, the reset voltage can dynamically be changed. For example, if ISO sensitivity is low, the reset voltage VDD# may be made higher to attain wider dynamic range and if ISO sensitivity is high, the reset voltage VDD# may be set lower to stabilize output characteristics.

Modification 2 of Embodiment 2

Figure 10:
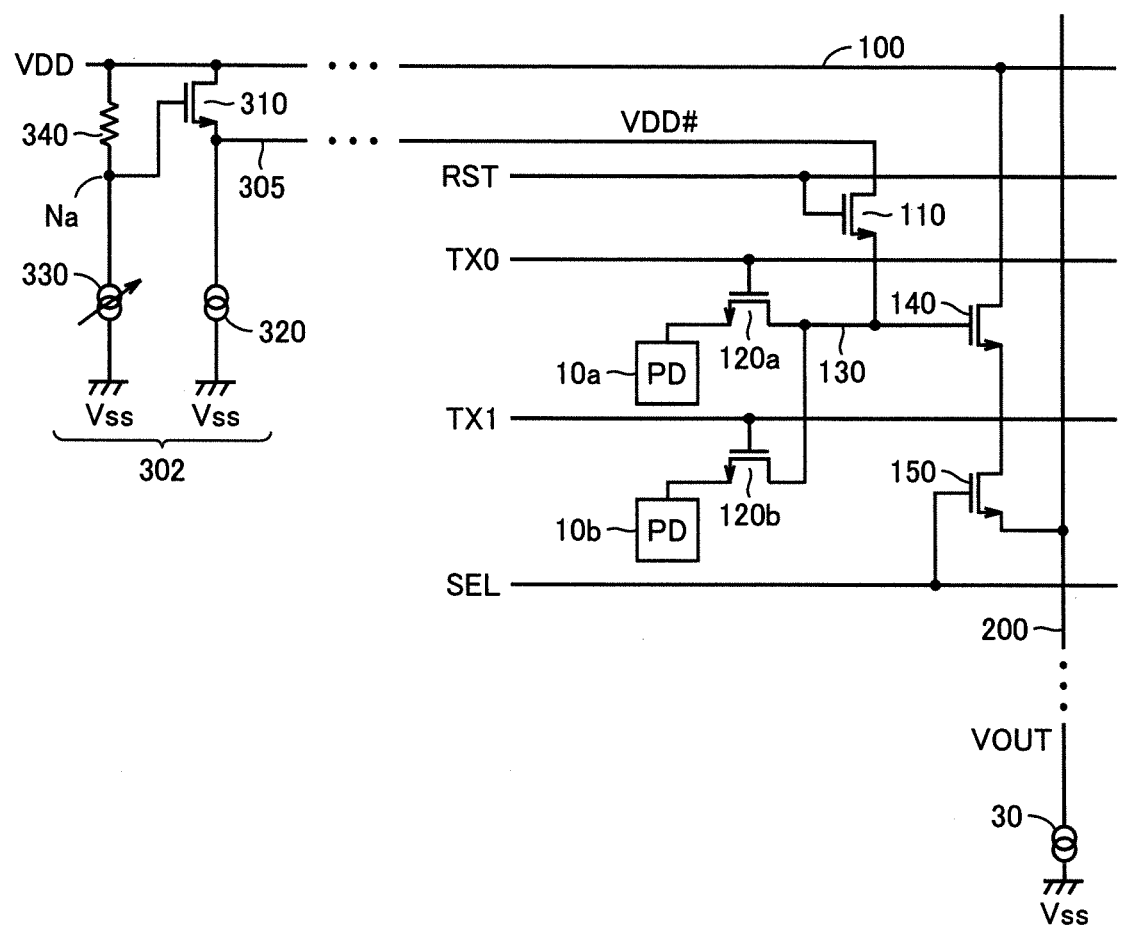
FIG. 10 is a circuit diagram illustrating a configuration for signal output from light receiving elements in accordance with Modification 2 of Embodiment 2.

FIG. 10 is a circuit diagram illustrating a configuration for signal output from light receiving elements in accordance with Modification 2 of Embodiment 2.

From the comparison between FIGS. 10 and 8, it can be seen that the configuration in accordance with Modification 2 of Embodiment 2 differs in that a reset voltage generating circuit 302 is provided in place of reset voltage generating circuit 300 shown in FIG. 8. Reset voltage generating circuit 302 has an NMOS transistor 310, a current source 320, a variable current source 330 and a resistance element 340. Reset voltage generating circuit 302 is formed by combining the structures of reset voltage generating circuits 300 and 301. Transistor 310 has its gate connected to a connection node Na between variable current source 330 and resistance element 340. In FIG. 10, arrangement of other portions is the same as that of FIG. 8 and, therefore, detailed description thereof will not be repeated.

In the configuration in accordance with Modification 2 of Embodiment 2, reset voltage VDD# output to reset voltage line 305 can be varied in accordance with the amount of current from variable current source 330, as in Modification 1 of Embodiment 2 (FIG. 9). Further, as in the configuration in accordance with Embodiment 2 (FIG. 8), even when Vth of each MOS transistor varies because of temperature or variation in wafer process, the voltage difference between VDD# (VDD−Vth) and Vth of each MOS transistor can be ensured. Therefore, stable output characteristics can be obtained. Specifically, the effects attained by Embodiment 2 and by Modification 1 thereof can both be attained.

Modification 3 of Embodiment 2

Figure 11:
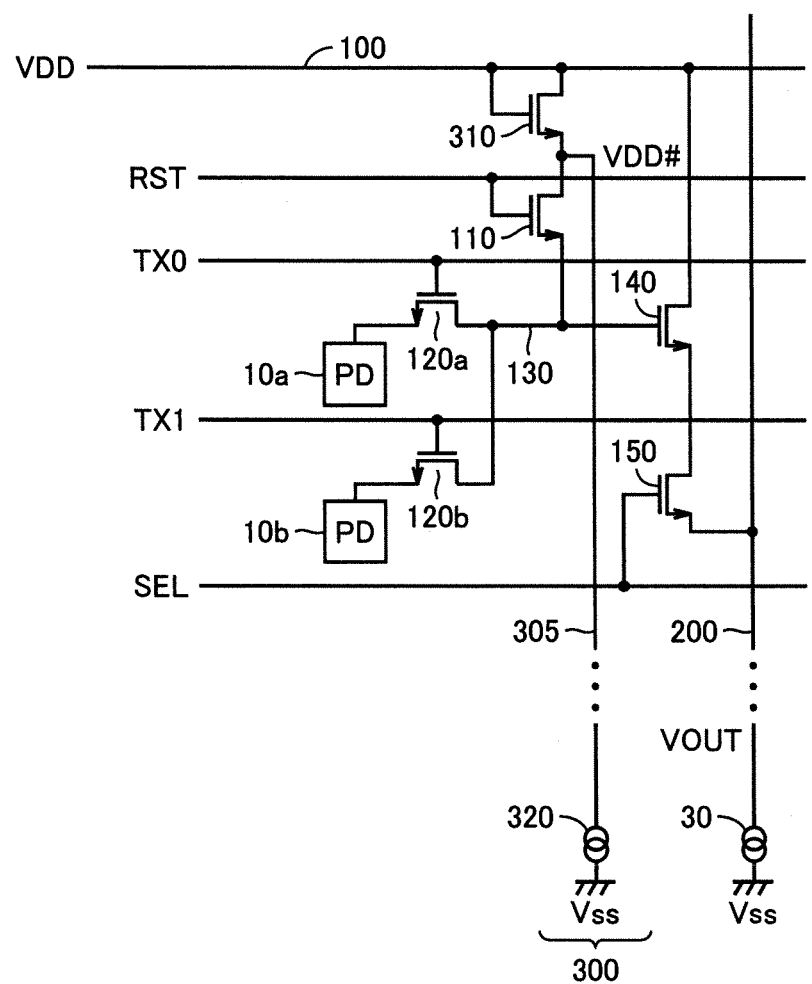
FIG. 11 is a circuit diagram illustrating a configuration for signal output from light receiving elements in accordance with Modification 3 of Embodiment 2.

FIG. 11 is a circuit diagram illustrating a configuration for signal output from light receiving elements in accordance with Modification 3 of Embodiment 2.

From the comparison between FIGS. 11 and 8, it can be seen that in the configuration in accordance with Modification 3 of Embodiment 2, the configuration of reset voltage generating circuit 300 for generating reset voltage VDD# is provided in pixel array 6.

As shown in FIG. 11, an NMOS transistor 310 and a current source 320 forming reset voltage generating circuit 300 are arranged corresponding to each column. Reset voltage line 305 is arranged extending in the direction along the column. The configuration and operation of reset voltage generating circuit 300 are the same as those described with reference to Embodiment 2 and, therefore, detailed description thereof will not be repeated.

In the configuration in accordance with Modification 2 of Embodiment 2, reset voltage line 305 is arranged along the column direction and, therefore, it is unnecessary to increase the number of lines along the row direction. Therefore, even when the dimension in the column direction is limited, the effect of Embodiment 2 can be attained.

Embodiment 3

In Embodiment 3, a configuration realized by combining Embodiment 1 and its modifications as well as Embodiment 2 and its modifications will be described.

Figure 12:
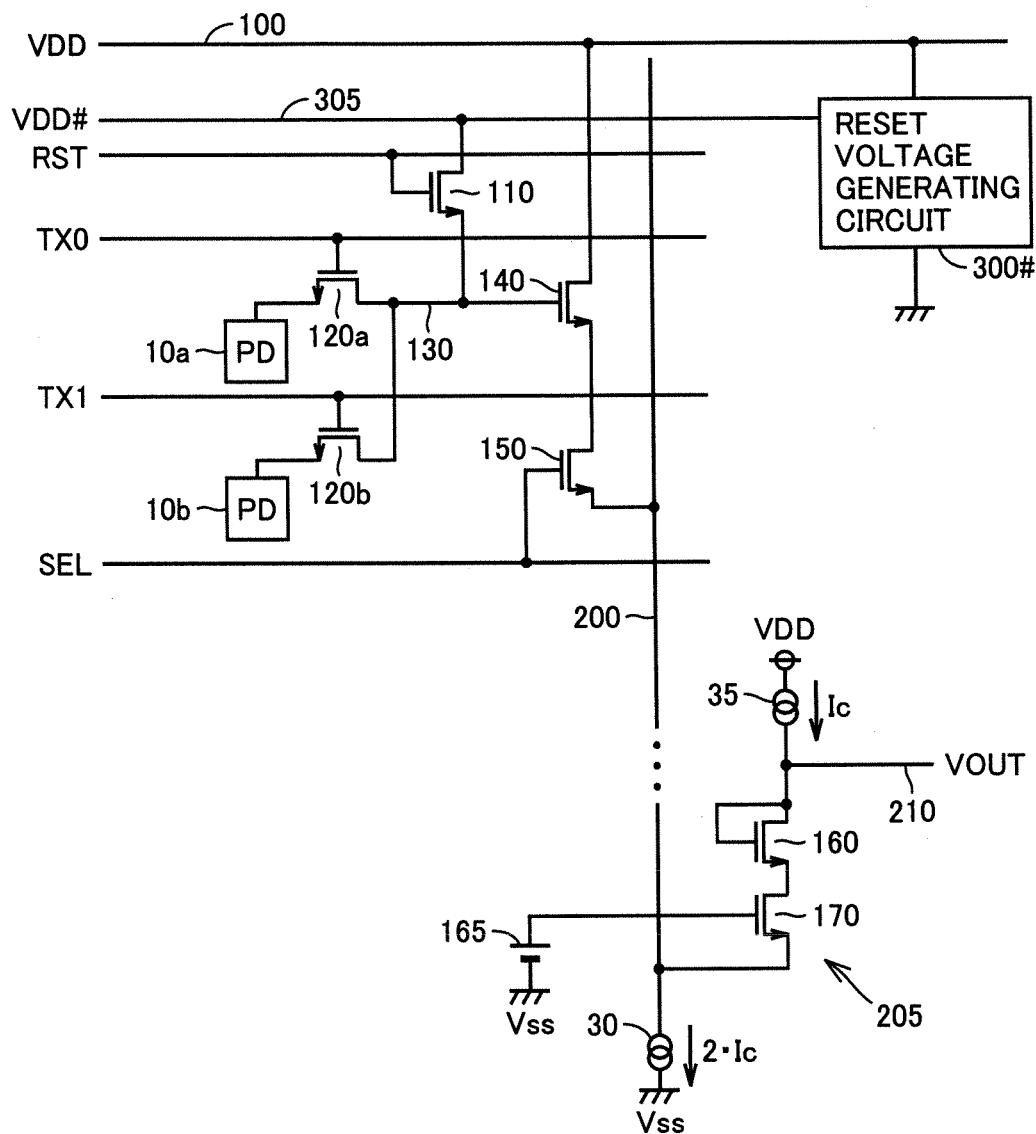
FIG. 12 is a circuit diagram illustrating a configuration for signal output from light receiving elements in accordance with Embodiment 3.

FIG. 12 is a circuit diagram illustrating a configuration for signal output from light receiving elements in accordance with Embodiment 3.

From the comparison between FIGS. 12 and 3, it can be seen that Embodiment 3 has the configuration for signal output in accordance with Embodiment 1 shown in FIG. 3, with reset transistor 110 provided between reset voltage line 305 and FD 130. To reset voltage line 305, the reset voltage VDD# generated by reset voltage generating circuit 300# described with reference to Embodiment 2 and its modifications is supplied. Reset voltage generating circuit 300# of Embodiment 3 generally represents reset voltage generating circuits 300, 301 and 302. Namely, any of reset voltage generating circuits 300, 301 and 302 may be used as reset voltage generating circuit 300#.

By such a configuration, in Embodiment 3, in addition to the effect attained by the configuration of signal output circuit in accordance with Embodiment 1, the output characteristics can be improved by preventing variation of reset potential of FD 130, without necessitating any mechanism for boosting power supply voltage VDD.

Further, by resetting the FD potential using reset voltage VDD#, it is possible to have the upper limit of output voltage VOUT from second output circuit 205 or the potential output to output node 210 not exceeding VDD−Vth. As a result, the output characteristics of second output circuit 205 can be improved.

When the power supply voltage VDD of second output circuit 205 is VDD, if the potential of output node 210 comes close to VDD and the transistor forming current source 35 reaches an non-saturated region, the current of current source 35 begins to decrease. When the current of current source 35 decreases, the current flowing through amplifying transistor 140 and selection transistor 150 forming the first output circuit (first output circuit) increases. As a result, the amount of current flowing through the first output circuit will be different from the amount of current flowing through the second output circuit. Then, the effect described with reference to Embodiment 1 is ruined, causing adverse influence on the improvement of output characteristics. Specifically, the output characteristics may possibly be lowered in the region where the amount of light received by light receiving element 10 is small (that is, when imaging is done with low illuminance). Therefore, in the configuration in accordance with Embodiment 1, it is preferred to drive the second output circuit 205 with a voltage higher than power supply voltage VDD.

In contrast, in the configuration in accordance with Embodiment 3, the upper limit potential of output node 210 does not exceed VDD−Vth and, therefore, sufficient amount of current for output transistor 170 can be ensured regardless of the amount of light received by light receiving element 10. Therefore, it becomes possible to improve the output characteristics at the time of imaging with low illuminance of the configuration for signal output in accordance with Embodiment 1, without necessitating any mechanism for boosting power supply voltage VDD.

Figure 17:
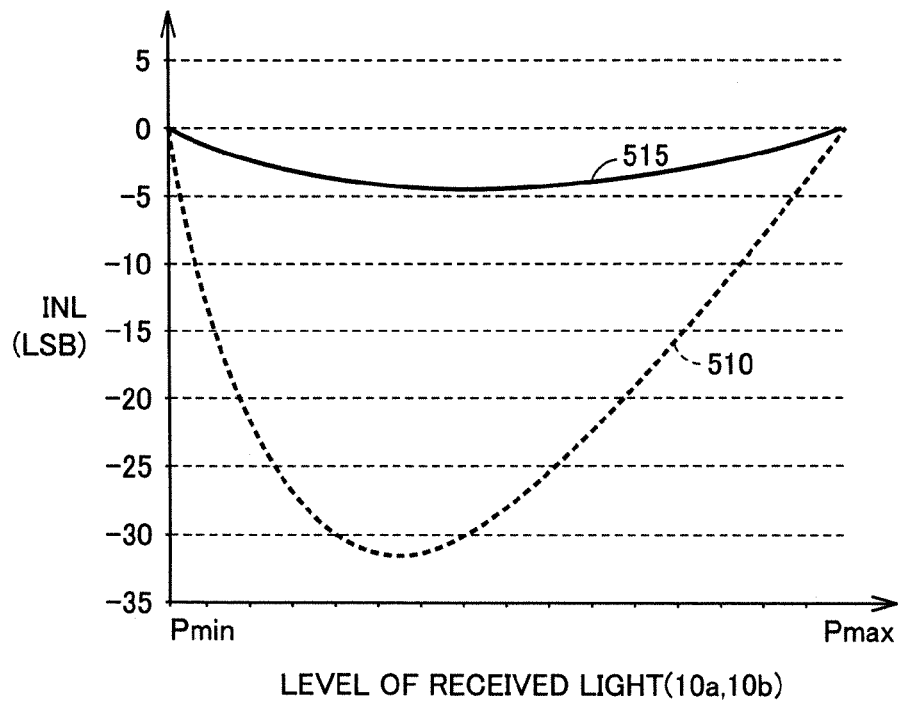
FIG. 17 is a first graph representing a result of circuit simulation illustrating the effect of Embodiment 3.

FIG. 17 is a first graph representing a result of circuit simulation illustrating the effect of Embodiment 3.

In FIG. 17 also, behaviors of FD potential and output voltage VOUT when the reading operations from two light receiving elements 10a and 10b sharing a common FD 130 are executed with a reset operation interposed are simulated by a circuit simulator, by setting element constants of each transistor. As in FIG. 16, the levels of light received by light receiving elements 10a and 10b were set to be the same, and output level VL defined in the same manner as in the examples of FIGS. 15A, 15B and 16 was simulated at the time of reading from light receiving element 10a and at the time of reading from light receiving element 10b, respectively.

Further, for light receiving element 10b, integral non-linearity (INL) between the A/D equivalent values of input (amount of received light) and output level VL was calculated. INL is represented using LSB (Lease Significant Bit) as a unit.

In FIG. 17, the abscissa represents the level of light received by light receiving elements 10a and 10b, and the ordinate represents INL between the input and output of light receiving element 10b, that is, the INL between the amount of light and the output level VL in the reading operation of light receiving element 10b after resetting. When INL=0, the input/output have the perfect linearity, and when the linearity degrades, the value |INL| becomes larger.

For each of the comparative example (FIG. 2) and in Embodiment 3 (FIG. 12), the above-described reading operation when the control voltage Vg (H-level potential of reset signal RST) of reset transistor 10 is set to VDD was simulated. A characteristic line 510 in dotted line represents the result of simulation for the configuration of comparative example (FIG. 2) and a characteristic line 525 in solid line represents the result of simulation for the configuration of Embodiment 3 (FIG. 12).

In the comparative example (FIG. 2), as in FIG. 16, the FD potential after resetting varies in accordance with the amount of light received by light receiving element 10a. Since the biased state of amplifying transistor 140 and selection transistor 150 also changes as the FD potential changes, the linearity of output level VL with respect to the FD potential degrades. As a result, the linearity between input and output also degrades. It is particularly noted that the linearity is degraded to the range of INL=−30 to −35, in the range of moderate amount of light reception.

In contrast, in Embodiment 3 (FIG. 12), the control voltage Vg (Vg=VDD) of reset transistor 110 is higher than the reset voltage VDD# and, therefore, the FD potential can fully be reset even when the amount of light received by light receiving element 10a is large. Further, by the second output circuit (output transistors 160 and 170), the change in biased state of amplifying transistor 140 and selection transistor 150 can be reflected to output voltage VOUT.

As a result, in Embodiment 3 (FIG. 12), the linearity between input and output is improved. Particularly, even in the range of moderate light receiving amount, the INL value is at most −5 (LSB), and INL can be reduced to approximately ⅙.

Figure 18:
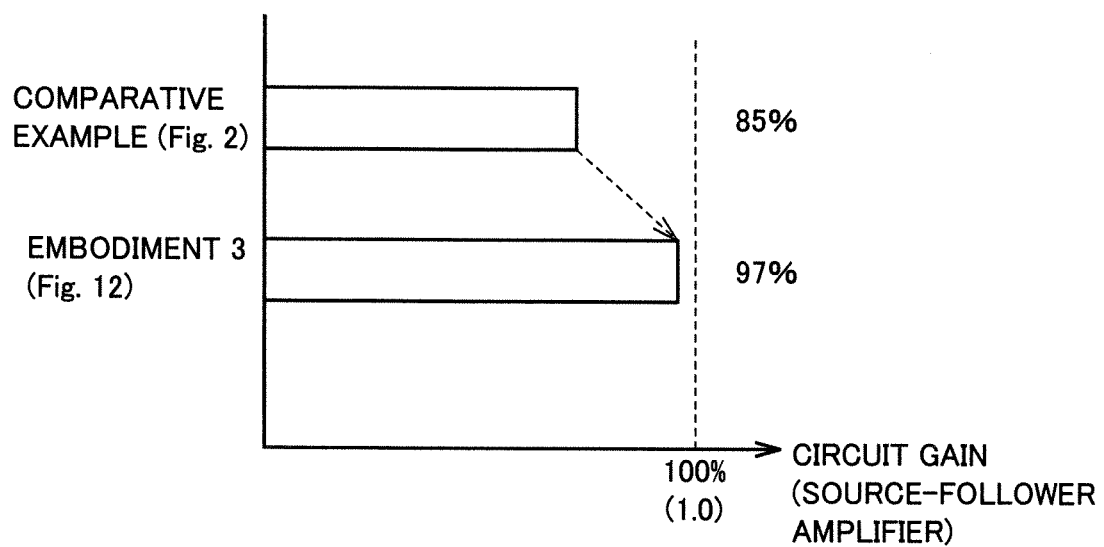
FIG. 18 is a second graph representing a result of circuit simulation illustrating the effect of Embodiment 3.

FIG. 18 compares the gain of source-follower circuit including amplifying transistor 140 of the comparative example (FIG. 2) and Embodiment 3 (FIG. 12).

In the simulation of FIG. 18, the ratio of change in the source voltage with respect to the change in gate voltage (FD potential) of amplifying transistor 140, when the reading operation was simulated in the similar manner as in FIG. 17, was calculated as the gain of source-follower circuit, for each of the comparative example (FIG. 2) and Embodiment 3 (FIG. 12).

As can be understood from FIG. 18, in the comparative example (FIG. 2), the gain of source-follower circuit is limited to 85%, while in Embodiment 3 (FIG. 12), the gain is increased to 97%, since the FD potential after reset is stable. Thus, it can be understood that the reading operation from each of light receiving elements 10a and 10b can be executed with the gain being close to the theoretical value (1.0=100%) of the source-follower circuit.

Modification 1 of Embodiment 3

The configuration for signal output in accordance with a modification of Embodiment 1 can be combined with Embodiment 2 and its modifications.

Figure 13:
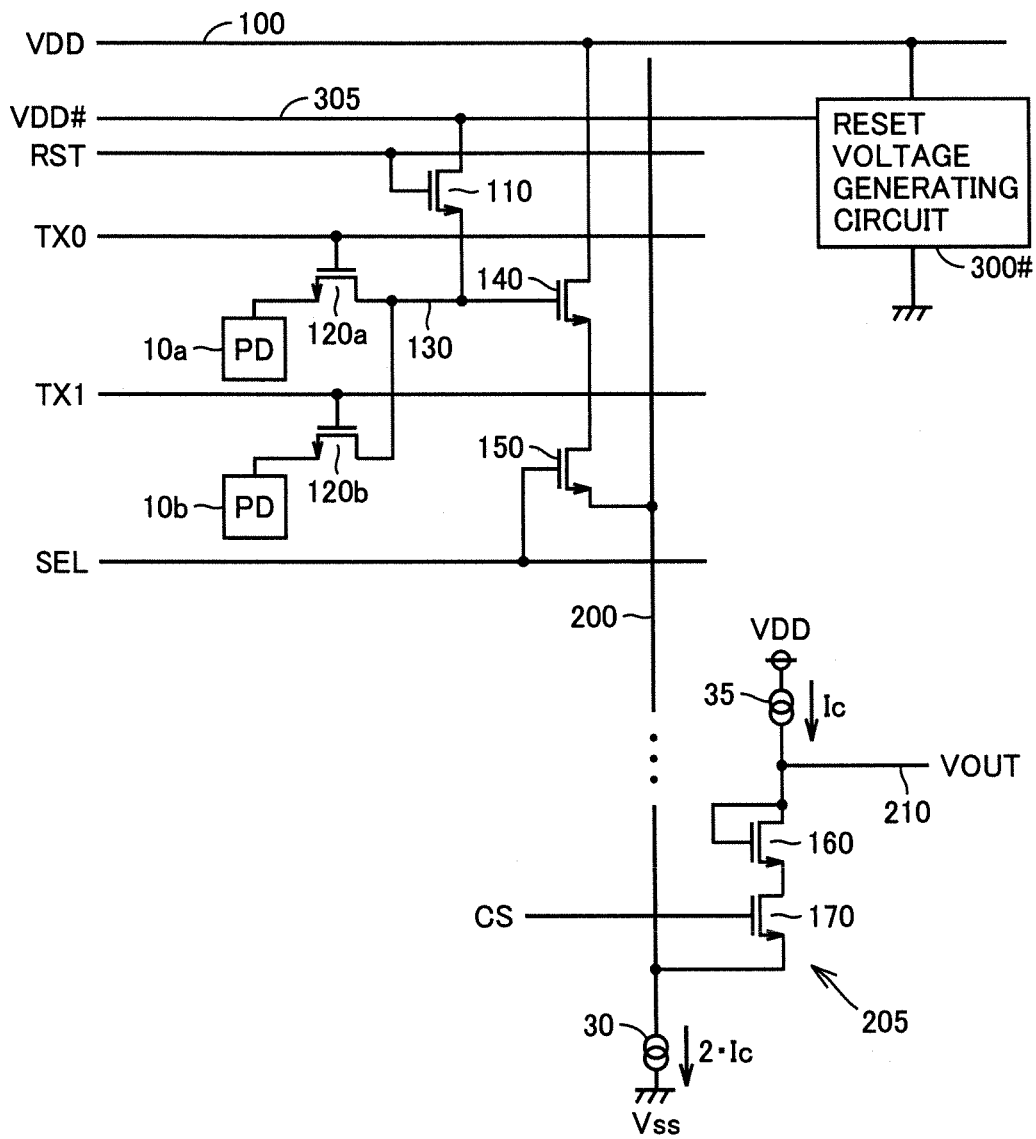
FIG. 13 is a circuit diagram illustrating a configuration for signal output from light receiving elements in accordance with Modification 1 of Embodiment 3.

FIG. 13 is a circuit diagram illustrating a configuration for signal output from light receiving elements in accordance with Modification 1 of Embodiment 3.

From the comparison between FIGS. 13 and 4, it can be seen that Modification 1 of Embodiment 3 corresponds to the configuration for signal output in accordance with Embodiment 1 shown in FIG. 4, with reset transistor 110 provided between reset voltage line 305 and FD 130. To reset voltage line 305, reset voltage VDD# generated by reset voltage generating circuit 300# is supplied.

Because of this configuration, Modification 1 of Embodiment 3 can attain the effect realized by the configuration of signal output circuit in accordance with Modification 1 of Embodiment 1 and, in addition, it can improve the output characteristics, as it prevents the variation of reset potential of FD 130.

Further, as in Embodiment 3, it becomes possible to improve the output characteristics of the configuration for signal output in accordance with Modification 1 of Embodiment 1 for imaging with low illuminance, without the necessity of providing a mechanism for boosting the power supply voltage VDD.

Modification 2 of Embodiment 3

Figure 14:
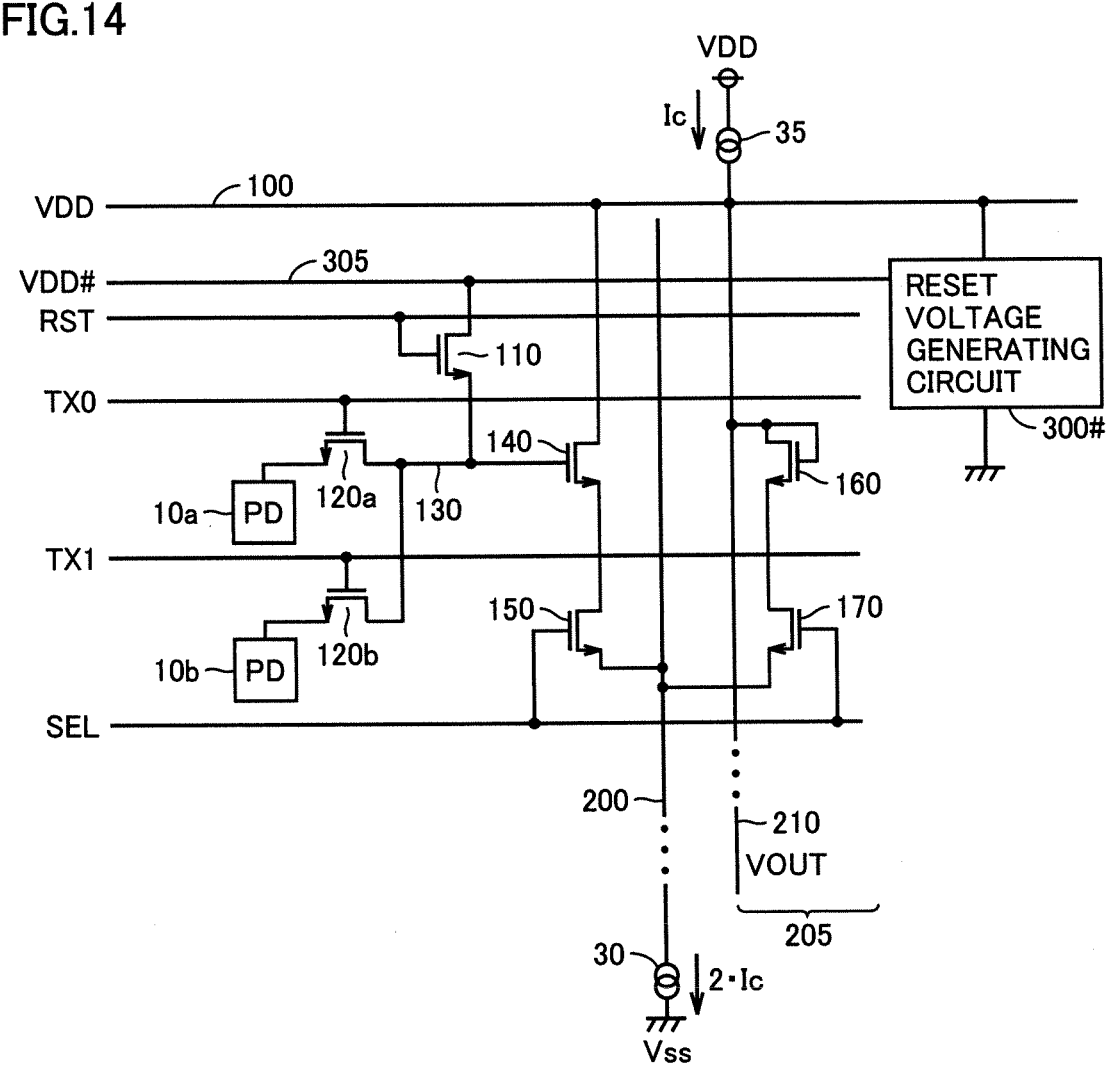
FIG. 14 is a circuit diagram illustrating a configuration for signal output from light receiving elements in accordance with Modification 2 of Embodiment 3.

FIG. 14 is a circuit diagram illustrating a configuration for signal output from light receiving elements in accordance with Modification 2 of Embodiment 3.

From the comparison between FIGS. 14 and 5, it can be seen that Modification 2 of Embodiment 3 corresponds to the configuration of Modification 2 of Embodiment 1, with reset transistor 110 provided between reset voltage line 305 and FD 130. To reset voltage line 305, reset voltage VDD# generated by reset voltage generating circuit 300# is supplied.

Because of this configuration, Modification 2 of Embodiment 3 can attain the effect realized by the configuration of signal output circuit in accordance with Modification 2 of Embodiment 1 and, in addition, it can improve the output characteristics, as it prevents the variation of reset potential of FD 130.

Further, as in Embodiment 3, it becomes possible to improve the output characteristics of the configuration for signal output in accordance with Modification 2 of Embodiment 1 for imaging with low illuminance, without the necessity of providing a mechanism for boosting the power supply voltage VDD.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid-state imaging device, comprising:
a light receiving element generating and storing charges in accordance with an amount of received light;
a floating diffusion configured to receive charges transferred from said light receiving element;
a first output circuit driven by a power supply voltage, and configured to output a voltage in accordance with a potential of said floating diffusion to a data line;
a second output circuit connected in parallel with said first output circuit to said data line;
a reset voltage generating circuit configured to output a reset voltage to a reset voltage line by lowering said power supply voltage; and
a reset transistor electrically connected between said reset voltage line and said floating diffusion and turned on in response to a reset signal; wherein
said first output circuit includes at least one first transistor electrically connected between said data line and a power supply line supplying said power supply voltage;
said second output circuit includes
an output node to which an output voltage in accordance with the potential of said floating diffusion is generated, and
at least one second transistor connected between said output node and said data line on a path from said power supply line through said output node to said data line; and
said second transistor is configured to generate a potential difference equivalent to a potential difference between said floating diffusion and said data line derived from said first transistor between said data line and said output node, when a current equivalent to a current flowing through said first transistor is caused to flow through said second transistor.

2. The solid-state imaging device according to claim 1, wherein
said first output circuit further includes a first current source causing a first amount of current to flow through said data line;
said first transistor includes
an amplifying transistor electrically connected between said power supply line and said data line and having its gate connected to said floating diffusion, and
a selection transistor electrically connected in series with said amplifying transistor between said power supply line and said data line,
said selection transistor receiving at its gate a first control signal and configured to control on/off of said selection transistor;
said second output circuit further includes
a second current source for supplying a current half the amount of said first amount of current to the path from said power supply line through said output node to said data line;
said second transistor includes
a first output transistor electrically connected between said output node and said data line and having its gate connected to said output node, and
a second output transistor electrically connected between said first output transistor and said data line; and
a voltage equivalent to a voltage of said first control signal for turning on said selection transistor is input to the gate of said second output transistor.

3. The solid-state imaging device according to claim 2, wherein
a second control signal for controlling on/off of said second output transistor is input to the gate of said second output transistor;
the voltage of said first control signal for turning on said selection transistor is equivalent to the voltage of said second control signal for turning on said second output transistor; and
said second control signal is generated such that said second output transistor is turned on after said selection transistor is turned on by said first control signal.

4. The solid-state imaging device according to claim 2, wherein
a plurality of said first output circuits and a plurality of said floating diffusions are arranged for single said data line in common; and
said first output circuit with said selection transistor turned on is configured to output a voltage in accordance with a potential of a corresponding said floating diffusion to the single data line.

5. The solid-state imaging device according to claim 4, wherein
said second output circuit is provided common to said plurality of said first output circuits;
said amplifying transistor and said selection transistor are provided in a pixel array; and
said first and second output transistors are provided outside said pixel array.

6. The solid-state imaging device according to claim 4, wherein
said amplifying transistor and said selection transistor are provided for each of said first output circuits; and said amplifying transistor and said selection transistor, and said first and second output transistors are provided in a pixel array.

7. The solid-state imaging device according to claim 1, wherein
said reset voltage generating circuit includes a voltage lowering transistor connected between said power supply line and said reset voltage line and having its gate connected to said power supply line.

8. The solid-state imaging device according to claim 1, wherein
said reset voltage generating circuit includes a voltage control circuit for variably controlling said reset voltage.

9. The solid-state imaging device according to claim 1, wherein
said reset voltage generating circuit includes
a voltage lowering transistor connected between said power supply line and said reset voltage line, and
a voltage control circuit configured to variably control gate voltage of said voltage lowering transistor.

10. A solid-state imaging device, comprising:
a light receiving element generating and storing charges in accordance with an amount of received light;
floating diffusion configured to receive charges transferred from said light receiving element;
a first output circuit driven by a power supply voltage, and configured to output a voltage in accordance with a potential of said floating diffusion to a data line; and
a second output circuit connected in parallel with said first output circuit to said data line; wherein
said first output circuit includes at least one first transistor electrically connected between said data line and a power supply line supplying said power supply voltage;
said second output circuit includes
an output node to which an output voltage in accordance with a potential of said floating diffusion is generated, and
at least one second transistor connected between said output node and said data line; and
said second transistor is configured to generate a potential difference equivalent to a potential difference between said floating diffusion and said data line derived from said first transistor between said data line and said output node, when a current equivalent to a current flowing through said first transistor is caused to flow through said second transistor.

11. The solid-state imaging device according to claim 10, wherein
said first output circuit further includes a first current source causing a first amount of current to flow through said data line;
said first transistor includes
an amplifying transistor electrically connected between said power supply line and said data line and having its gate connected to said floating diffusion, and
a selection transistor electrically connected in series with said amplifying transistor between said power supply line and said data line,
said selection transistor receiving at its gate a first control signal for controlling on/off of said selection transistor;
said second output circuit further includes
a second current source for supplying a current half the amount of said first amount of current to a path from said output node to said data line;
said second transistor includes
a first output transistor electrically connected between said output node and said data line and having its gate connected to said output node, and
a second output transistor electrically connected between said first output transistor and said data line; and
a voltage equivalent to a voltage of said first control signal for turning on said
selection transistor is input to the gate of said second output transistor.

12. The solid-state imaging device according to claim 11, wherein
a second control signal for controlling on/off of said second output transistor is input to the gate of said second output transistor;
the voltage of said first control signal for turning on said selection transistor is equivalent to the voltage of said second control signal for turning on said second output transistor; and
said second control signal is generated such that said second output transistor is turned on after said selection transistor is turned on by said first control signal.

13. The solid-state imaging device according to claim 11, wherein
a plurality of said first output circuits and a plurality of said floating diffusions are arranged for single said data line in common; and
said first output circuit with said selection transistor turned on is configured to output a voltage in accordance with a potential of a corresponding said floating diffusion to the single common data line.

14. The solid-state imaging device according to claim 13, wherein
said second output circuit is provided common to said plurality of said first output circuits;
said amplifying transistor and said selection transistor are provided in a pixel array; and
said first and second output transistors are provided outside said pixel array.

15. The solid-state imaging device according to claim 13, wherein
said amplifying transistor and said selection transistor are provided for each of said first output circuits; and
said amplifying transistor and said selection transistor, and said first and second output transistors are provided in a pixel array.

* * * * *